(12) United States Patent
Bullock

(10) Patent No.: US 6,653,517 B2
(45) Date of Patent: Nov. 25, 2003

(54) HYDROCARBON CONVERSION APPARATUS AND METHOD

(76) Inventor: Billy P Bullock, 306 Second St., Jonesville, LA (US) 71343-0082

( * ) Notice: Subject to any disclaimer, the term of this patent is extended or adjusted under 35 U.S.C. 154(b) by 102 days.

(21) Appl. No.: 09/825,404

(22) Filed: Apr. 3, 2001

(65) Prior Publication Data
US 2002/0177745 A1 Nov. 28, 2002

(51) Int. Cl.$^7$ ................................................ C07C 1/00
(52) U.S. Cl. ........................ 585/241; 585/240; 585/242
(58) Field of Search .............................. 585/240, 241, 585/242

(56) References Cited

U.S. PATENT DOCUMENTS

| | | | |
|---|---|---|---|
| 3,843,457 A | * 10/1974 | Grannen et al. | 201/19 |
| 4,118,282 A | 10/1978 | Wallace | 201/2.5 |
| 4,235,674 A | 11/1980 | Yue | 176/87 |
| 4,412,889 A | 11/1983 | Oeck | 202/117 |
| 4,439,209 A | 3/1984 | Wilwerding et al. | 48/76 |
| 4,759,300 A | 7/1988 | Hansen et al. | 110/229 |
| 4,806,232 A | 2/1989 | Schmidt | 208/226 |
| 4,867,755 A | 9/1989 | Majid et al. | 44/604 |
| 5,084,141 A | * 1/1992 | Holland | 201/19 |
| 5,389,691 A | * 2/1995 | Cha et al. | 105/79 |
| 5,902,915 A | * 5/1999 | Melnichuk et al. | 585/241 |
| 5,968,400 A | 10/1999 | Wicks et al. | 219/679 |
| 6,039,774 A | 3/2000 | McMullen et al. | 48/102 A |
| 6,046,376 A | * 4/2000 | Cha et al. | 588/238 |
| 6,156,439 A | 12/2000 | Coffinberry | 428/464 |

* cited by examiner

Primary Examiner—Thuan D. Dang
(74) Attorney, Agent, or Firm—Michael A Mann; Nexsen Pruet Jacobs & Pollard, LLC

(57) ABSTRACT

Presented is a method and apparatus for converting both organic and inorganic materials into more desirable products by the expedient of breaking down these materials into their stable molecular constituents and reforming them into more desirable substances. The process involves the use of two chambers. Blended solid and fluid wastes are augered into the first chamber and agitated, preferably by rotating the chamber so that the waste tumbles over internal fins, while a heat gradient is applied. Carbon and inorganic solid wastes are removed from the system and fluid wastes passed to a second chamber where they are again subjected to a heat gradient. Effluents are recovered and condensed. Electromagnetic radiation, preferably from microwaves, and/or lasers, masers or ultrasonic energy is applied to the wastes in both chambers. Liberal use of catalysts is made in the chambers. In addition, the augering system is based on the use of two, counter-rotating, inter-lapped, symmetric augers for positive feed of materials.

10 Claims, 13 Drawing Sheets

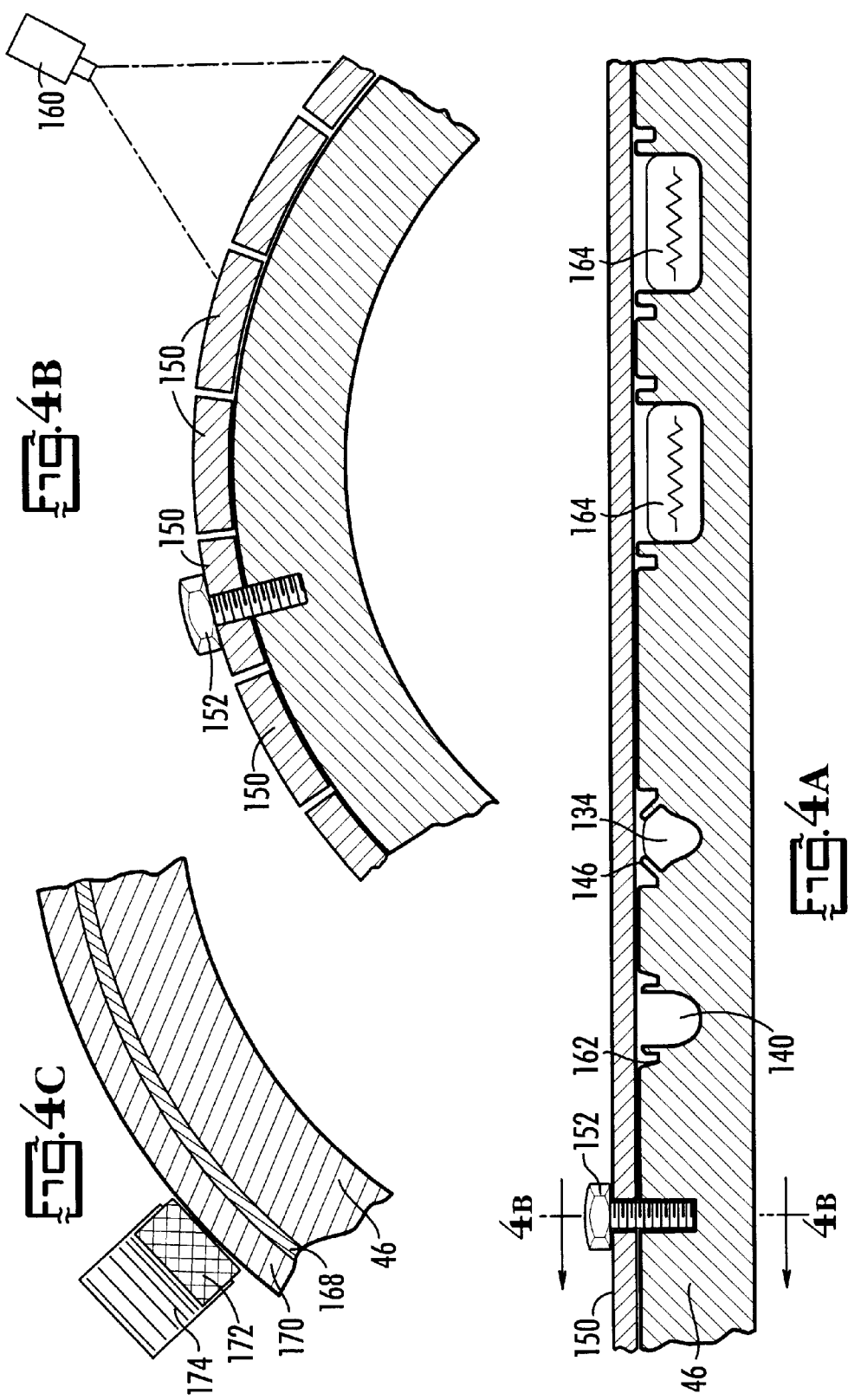

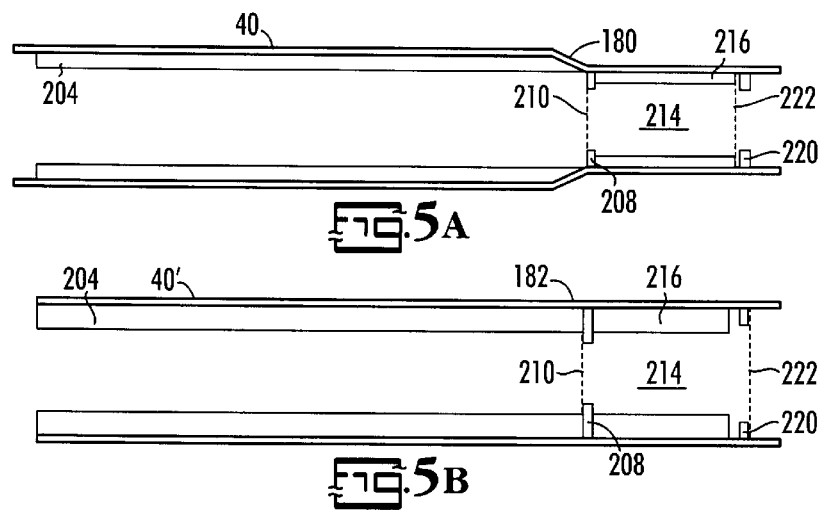
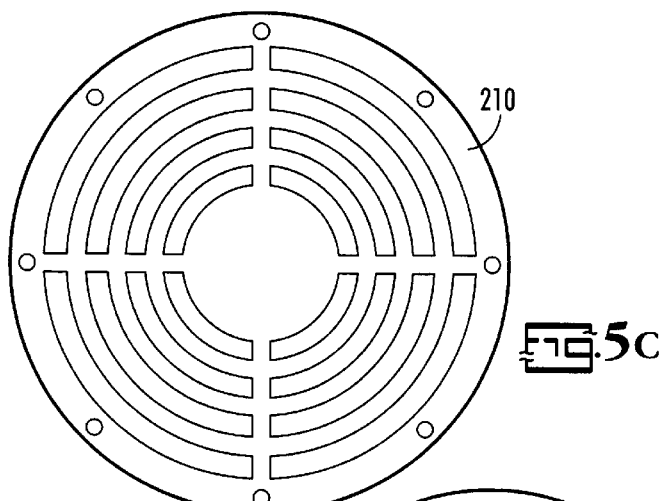
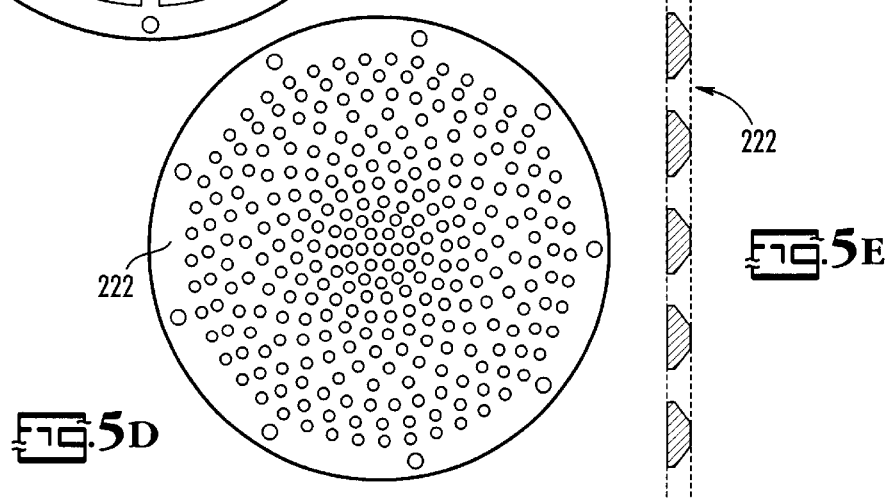

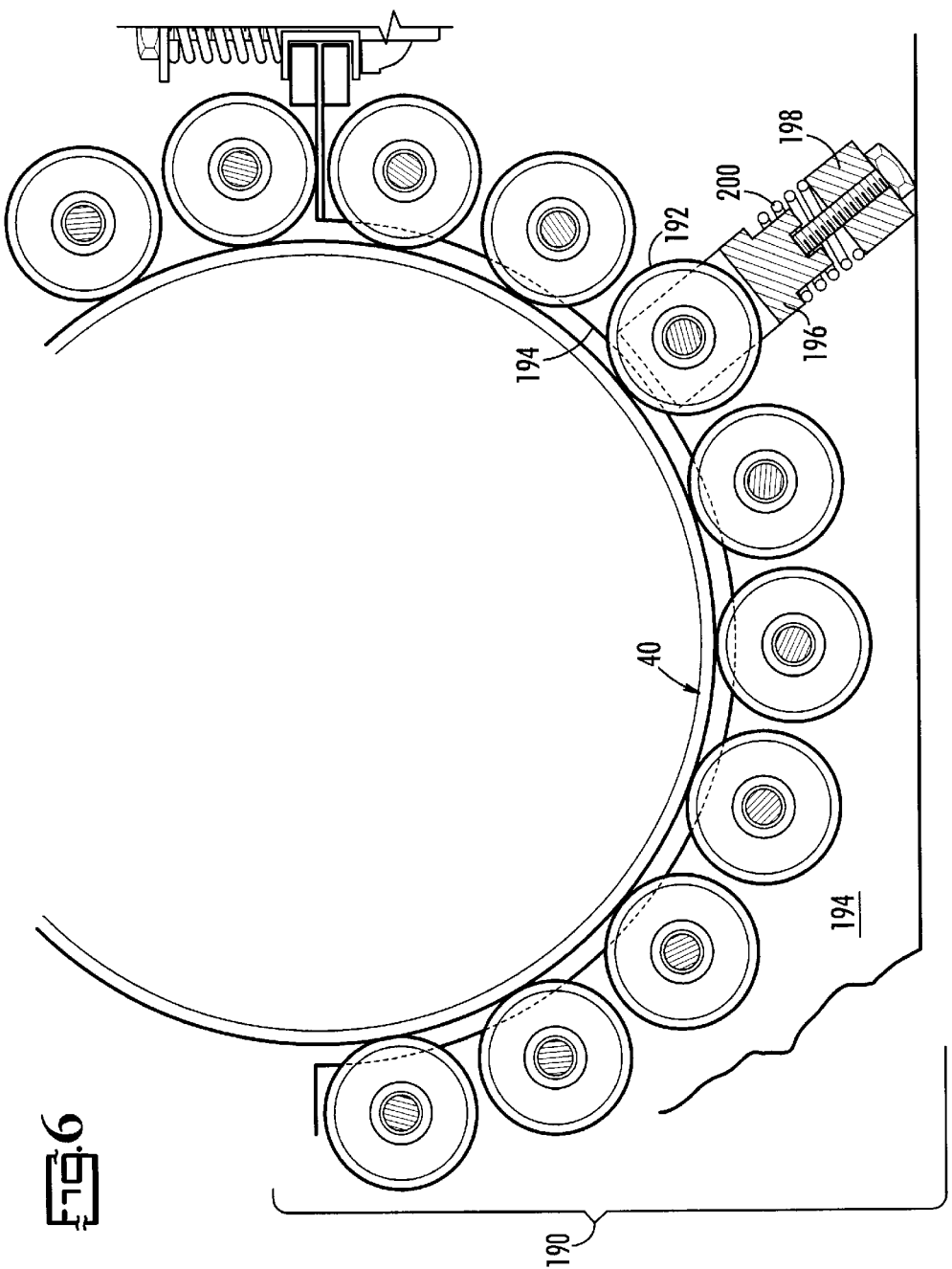

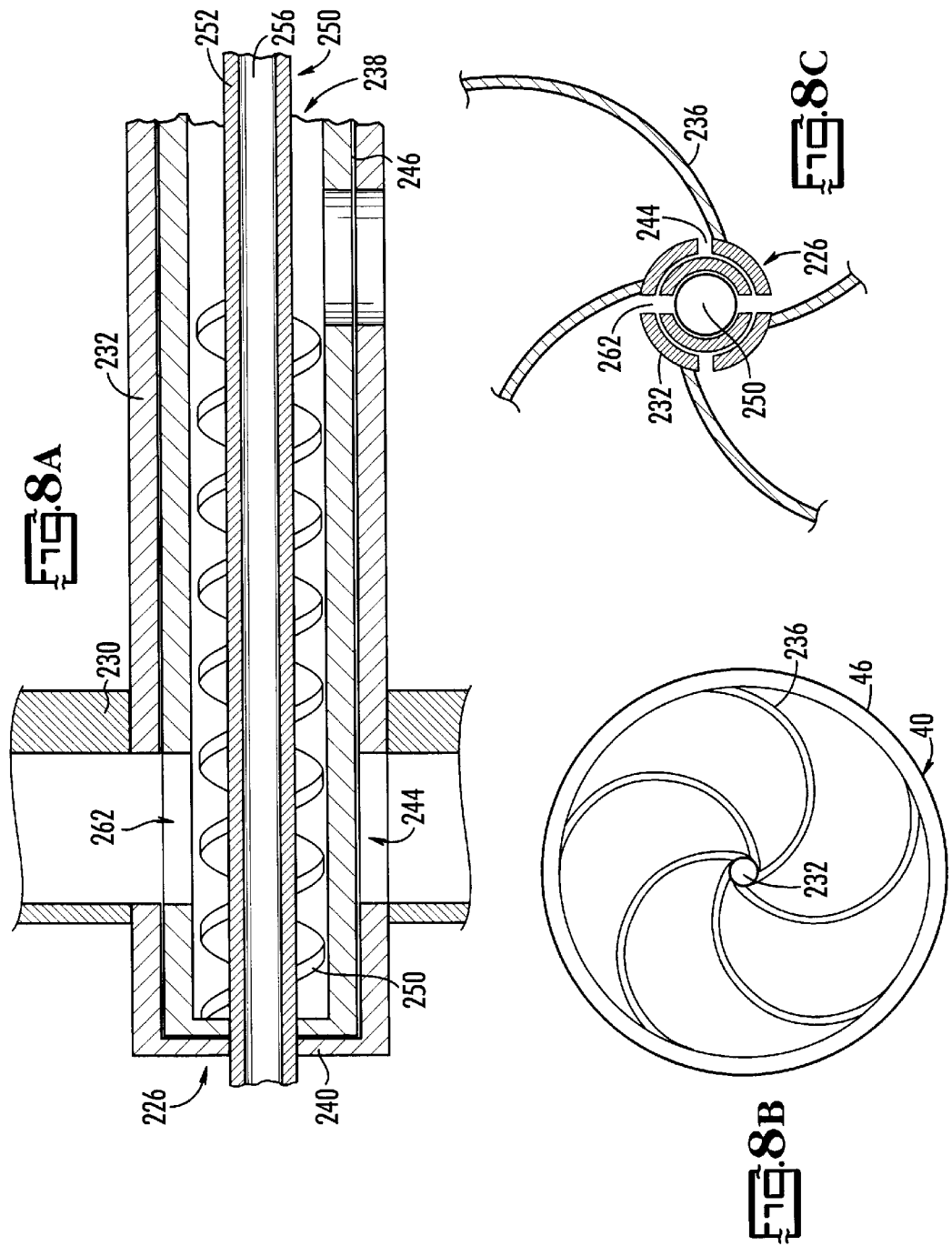

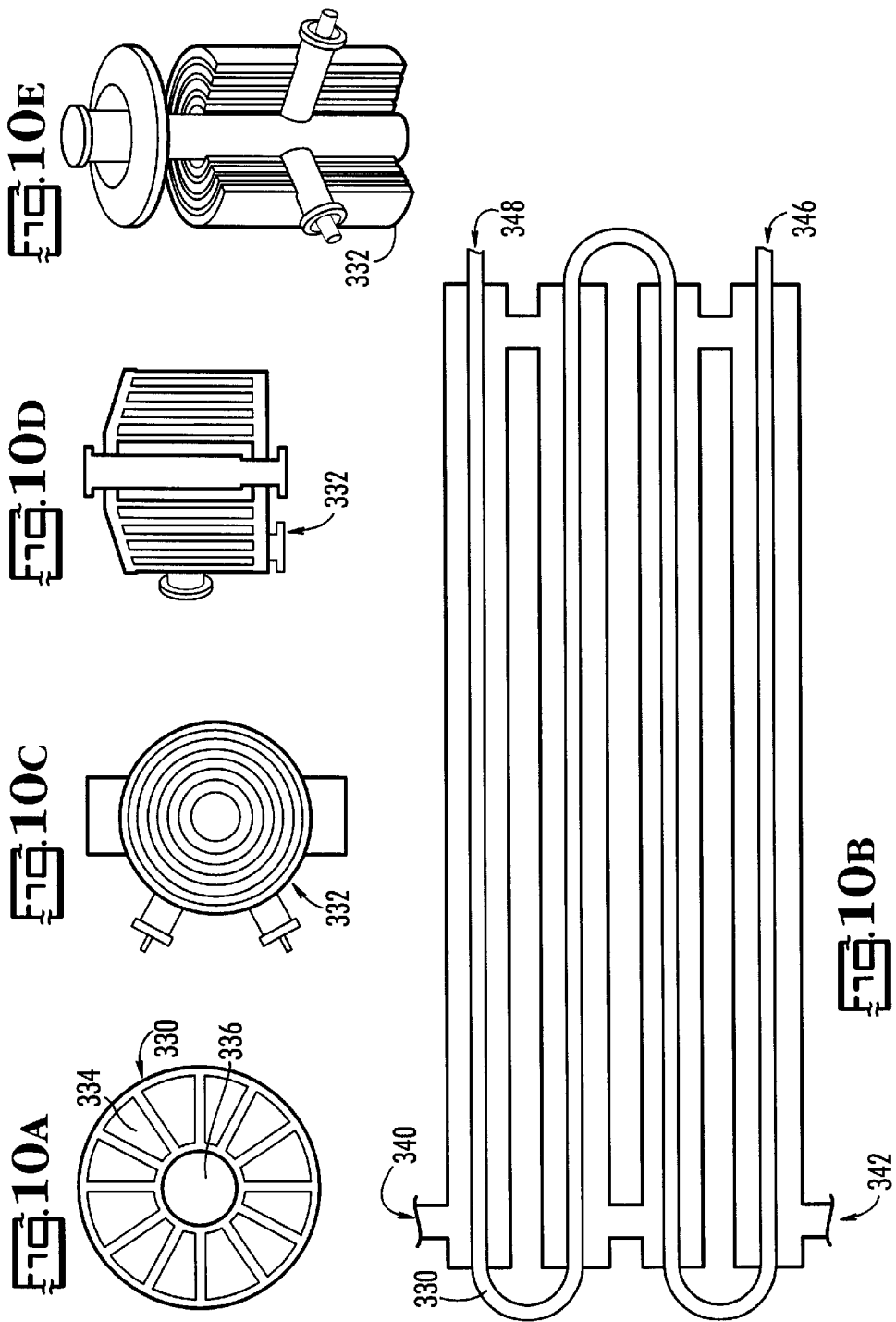

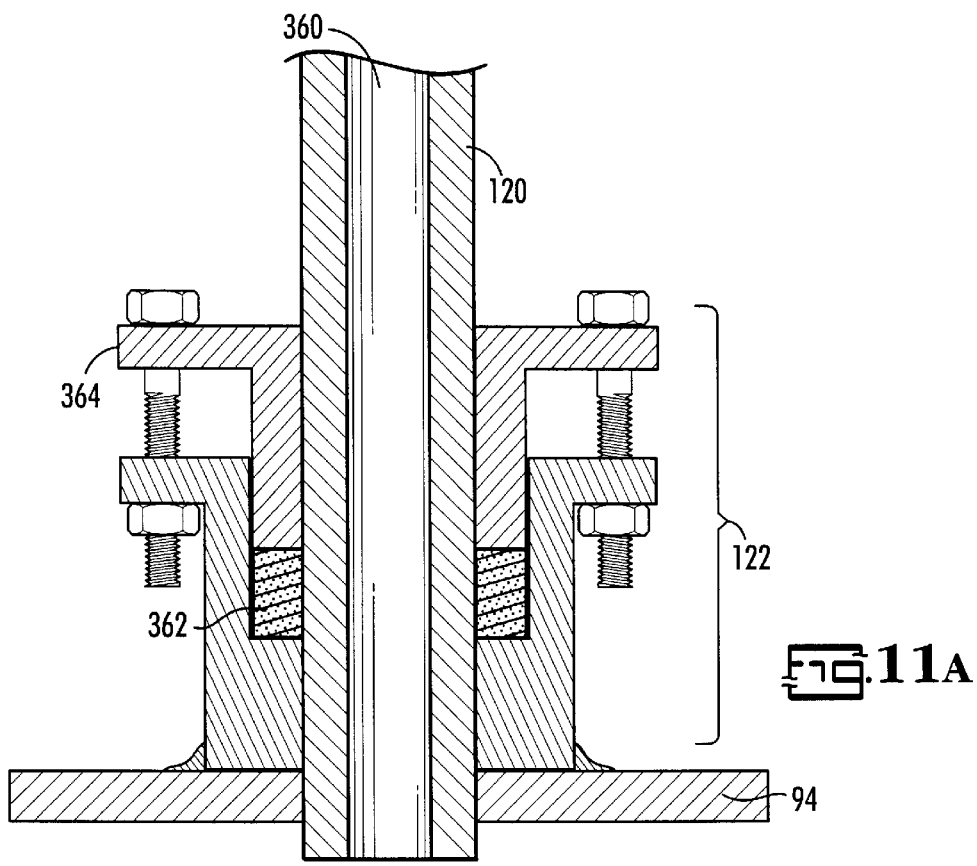
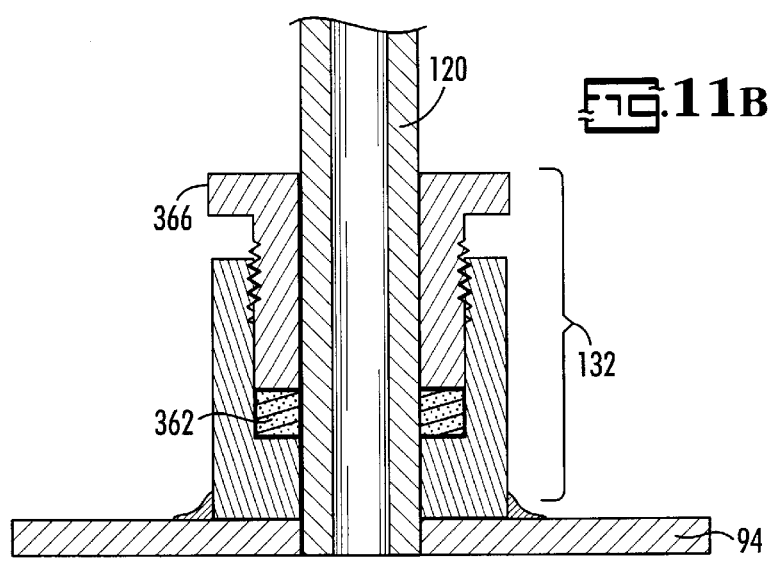

HYDROCARBON CONVERSION APPARATUS AND METHOD

FIELD OF THE INVENTION

The present invention relates generally to industrial chemical conversion of wastes. In particular, it relates to conversion of organic and inorganic materials to useful fuels and other products.

DISCUSSION OF BACKGROUND

Converting wastes to useful end products, such as fuels, has been the goal of considerable efforts. Several approaches to achieving this goal have been tried, including pyrolysis. While this invention is definitely not a variation on the art of pyrolysis, the original research which resulted in this invention was primarily in that field. Therefore, it is only fitting that any discussion of the background of this invention begin there.

The art of pyrolysis is reputed to have began in the 1500's. It is presently described as the destructive distillation of any material. The original successful industrial results of this art were the production of coal tar and coal oil from the pyrolysis of coal. The second, coal oil, was widely used as an illuminating oil throughout the world until the development of kerosene during the early petroleum industrial development.

In the world's oilfields, many thousands of barrels of crude oil have been burned as a result of early attempts at disposal. This "waste" crude oil was usually collected on waste pits on or near production facilities (called "leases") and refineries. There were numerous attempts to treat this waste in a way that would allow its useful recovery or conversion to a useful form. Pyrolysis of the waste was attempted but had many practical limitations. Close examination of attempts to address the problem of the proper treatment of this waste shows that the original inherent problems remain.

In the prior art the usual design and operating practice has been to place the feedstock in a retorting device from which the ambient atmosphere can be excluded, heating the materials to between 500 and 2,000 degrees F., and recovering the volatized and condensed materials in some form of collection vessel. The solids residues, generally characterized as "char" are recovered in their combined form and usually disposed of as an industrial waste. However, there were and still are several problems resulting from such practices which make those systems impractical.

One of these is the problem of coking which resulted in all previous attempts from the deposition of heavy carbon deposits upon the interior walls of the pyrolysis retort system. This deposit increases in density and thickness to the point that it in effect acts as insulation, inhibiting the transfer of thermal energy into the system. There were additional problems with isolated buildups and concentrations of heat which often resulted in melt-downs of the retort walls resulting in catastrophic fires. This phenomenon has been observed in most of the other systems referenced. Many attempts have been made to prevent this problem, the latest being that described in U.S. Pat. No. 6,156,439 to Coffinberry issued Dec. 5, 2000 which suggests a coating on the interior walls of the retorting vessels and the balance of the system to resist the deposition of these materials.

An additional problem resulting from the coking phenomenon and the use of internal parts and components invariably results in the binding of these moving, especially rotating, parts and, with the complications resulting from the extreme interior temperatures, these moving parts can be destroyed. This was and is particularly true of interior coke-scraping and augering systems as disclosed in U.S. Pat. No. 4,439,209 to Wilwerding, et al., issued on May 27, 1984, where the scrapers (29) were repeatedly torn off and the evacuation auger (32) were prone to be ripped from their shafts and to stack at the end of their respective chambers as was demonstrated in 1987/88.

A related problem inherent in most prior art was that the introduced feedstock was dried into a cake on the interior walls of the retort and were then prone to rip the auger flites off their shafts and stack them at the end of the chamber. This was a particular problem of the design features of the system taught in U.S. Pat. No. 4,759,300 to Hansen, et al., issued on Jul. 26, 1988, when processing used petroleum drilling muds as well as in that disclosed in U.S. Pat. No. 4,412,889 to Oeck, issued Nov. 1, 1983.

Another problem invariably present in pyrolysis systems was and remains that of retroactive condensation reactions wherein, as the process progresses, hydrocarbon molecules are broken and the liberated hydrogen atoms are allowed to form hydrogen gas and to escape. As the remaining hydrocarbon elements are reformed they combine into progressively longer and more complex molecules until they become much like coal or coke. Many attempts have been made to address this problem over the years with the latest being U.S. Pat. No. 6,039,774 to McMullen, et al., issued Mar. 21, 2000.

Still another problem plaguing the practice of pyrolysis is that of the destabilization of the pyrolysis oils over relatively short time spans after production. The poor stability of pyro-oils has been mostly attributed to the high oxygenated compound content of these oils which gives rise to polymerization reactions and the subsequent increase in viscosity. This happens at any temperature and is accelerated by the presence of "pyrolysis char" in the stored processed oils. It often progresses to the point that the produced products are of even lesser value than the original feedstock materials. This process is well described in a paper: *Pyrolysis Char Catalyzed Destabilization of Biocrude Oils* presented by Foster A. Agblevor of Virginia Polytechnic Institute in 1997 to the ALCHE.

The prior art has produced systems that are extremely sensitive to variations in feedstock composition. To accommodate changes in feedstock, these systems must be modified.

In the past the attempted employment of lasers, ultrasound and microwave components in the systems has been confined entirely and exclusively to the production of thermal energy within the operating system. This is shown in U.S. Pat. No. 4,118,282 issued to Wallace on Oct. 3, 1978.

In all known instances there has been no attempt to maximize the transfer of thermal energy into the system or to recover spent thermal energy and re-introduce it to the processing system. (Re: all references cited, but particularly U.S. Pat. No. 4,439,209 issued to Wilwerding, et al., on Mar. 27, 1984.) This failure has occurred notwithstanding the fact that, in all known instances, the disclosed precesses are thermally driven. Not only has this resulted in wasting of fuels and energy, but it has also been a tremendous producer of thermal pollution. Often the furnace burner manufacturer states that the burner flame should be adjusted so that the exhaust stack temperature just above the retort is at approximately 450 degrees F. (re: Eclipse Boiler Division Instruction Manual # 179.)

Prior inventors have made many attempts to relieve the problem of sulfur/chlorine/fluorine contamination of both produced oils and gasses. These attempts have required the injection of contaminating slurries (U.S. Pat. No. 4,806,232 issued to Schmidt on Feb. 21, 1989 and U.S. Pat. No. 4,867,755 issued to Majid, et al., on Sep. 19, 1989) and other similar substances. Nowhere found are references to breaking the specific molecular bonds between these substances and their carbines carriers in order to remove and/or recover them.

In the past there have been no known attempts to recover the compressible gasses in their liquid forms. And while there have been attempts to operate such systems under an internal vacuum, this is not known to have been done in conjunction with the liquification of the compressible gasses.

Thus far there has been no discovery of the employment of catalytic elements that are energized by electromotive forces of any type in order to produce a desired or enhanced result.

In prior art the feedstock is introduced into the reaction chamber by means of a plunger mechanism (U.S. Pat. No. 4,439,209 issued to Wilwerding on Mar. 27, 1984) or by an auger screw mechanism using a single auger positioned within a channel or tube (U.S. Pat. No. 4,235,674 issued to Chambers issued on Nov. 25, 1980). These mechanisms are intended for use with solid and liquid feedstocks. However, they both are ineffective with liquids and do not prevent contact between the atmosphere and the solids or the liquids. (Usually the introduction of gases is not provided for.) Particularly with the utilization of augering systems, the augers tend to "load up" with solid feedstock and are unable to convey the materials into the system. This is particularly true with wetted feedstocks such as contaminated soils and other solids.

In all cases known, a particularly serious problem with rotating members of the system is the durability of the bearing and sealing systems for the rotating member joints. This was readily apparent from the description in U.S. Pat. No. 4,439,209 (Wilwerding) during demonstrations in 1987 and in U.S. Pat. No. 4,412,889 (Oeck).

In the prior attempts at waste conversion, the usual practice has been thermal or catalytic-assisted thermal cracking under high temperatures and/or pressures. These conditions often entail the use of temperatures in excess of 1,500 degrees F. and pressures in excess of 2,000 pounds per square inch during the process. These conditions necessitate heavy equipment that is not transportable with any measure of facility or ease.

Converting waste to useful fuels has also been the focus of federal research over the past decades. Many of these projects have been carried out under the auspices of the Idaho National Engineering and Environmental Laboratory (INEEL) under the jurisdiction of the Argonne National Laboratory operated for the U.S. Department of Energy by the University of Chicago.

One such project is described in the April, 1999 issue of the *INEEL Quarterly* under the heading of "From the Cooking Pot to the Gas Tank". This is an attempt to more economically convert used cooking oils into synthetic Diesel using a newly developed catalyst. As another example, the National Renewable Energy Laboratory, under the direction of the U.S. Department of Energy, has on-going research projects in many areas including catalytic pyrolysis and synthetic gas ("syngas") production.

However, there remains a need for an effective method and apparatus for converting a wide variety of materials, be they wastes or be they resources, to useful fuels and chemicals.

SUMMARY OF THE INVENTION

According to its major aspects and briefly recited, the present invention is a method and apparatus for the conversion of both organic and inorganic material into synthetic crude oils, gasoline and diesel components, synthetic fuel oils, carbonous materials, gases recoverable in compressed liquid forms, and gases incompressible into liquid forms. The present apparatus and method can operate on solid, liquid and gaseous materials in any combination and concentration and may include but are not limited to waste crude oils, dead animals, absorbency pads used in oil spill cleanups, waste tank bottoms, oil-based drilling muds, refinery and/or petrochemical wastes, spent solvents, contaminated soils and dirt, used cooking oils, used tire rubber and other rubber waste products, heavy oils, refinery residuals, contaminated fuels, waste plastics, municipal wastes and garbage, medical wastes, used lubricating oils, coal, oil tar sands, oil shales, agricultural products, bio-wastes or any other hydrocarbon-based material.

The apparatus includes a pair of retort vessels in communication with each other, one of which has two chambers. One chamber contains a fluidized bed of catalytic, feed and abrasive materials and the other a crusher mill. The vessels include lifting and stirring elements fixed to the interior walls to promote and help maintain a condition of fluidization of bed materials during operation. These vessels operate in the absence of atmospheric gases and at or below atmospheric pressure so as to help prevent the escape of pollutants into the atmosphere. Heat-collector/transfer members are attached to the exterior walls of the vessels to increase the heat collecting surface area of the exterior walls of the member in order to maximize the collection of thermal energy, increase the flow of thermal energy into said system, and reinforce and strengthen the exterior walls of the vessel. A thermal gradient is established in both or either one of the vertical and horizontal retort vessels and maintained during operation in order to create a "reflux action". Finally, the apparatus employs a solids residue crushing and pulverizing section.

The present apparatus and method employs microwave, laser, maser, and/or ultrasonic energy either independently or in concert to promote and control the precise disassociation of the molecular or atomic components of the feedstock materials during processing.

The present apparatus and method produces useful solids, liquids and compressible, condensible gases for recovery and sale, and which in some cases are used by the process itself to reduce its own energy requirements or as carrier gases to move product through the retort vessels to more quickly and efficiently convey the volatized materials through and out of the system. Because of the extensive reformation that takes place, once processed, the waste feedstock cannot be identified from the final products. Compression of product gases results in a negative pressure within the system which helps prevent the escape of and promote the recovery of uncompressed products which are rich in hydrogen gas.

The design of the present apparatus has several advantages, namely, it has no internal moving parts within a part of a heated environment of the system; by its design and operation, it prevents the formation of "coke" and "cake" and fully controls the "retrogressive condensation reaction" within the system.

Energy considerations are carefully addressed in the present design. In order to be more thermally efficient, the design of the present apparatus also employs a combined condensation/thermal recovery process which, in thermal counter-flow, recovers spent thermal energy from the out-flowing produced materials while pre-heating the in-coming feedstock materials and thereby returns said recovered thermal energy back into the operating environment of said system. This combination condensation/thermal transfer unit is partially made of catalytic metals and other materials in order to begin the conversion process in the preheat stage. Even a portion of the product gases, recovered as condensed liquids, can be used as fuel for producing the heat for the present reactions. Furthermore, the thermal energy used in the process is not allowed to escape the system in the form of thermal pollution.

Another feature of the present apparatus is an auger system for the introduction to and evacuation of solids materials from the processing environment. This auger system consists of a double auger in-feed system which operates so as to positively displace the feedstock into the processing environment without blockage or other impediment, and an out-feed auger system consisting of a solids residue separation segment, a sliding valve segment to convey the solids residue into the auger channel, an auger within this channel which moves the residues away from the operating environment and a sliding valve component which allows the solids residues to exit the operating system without allowing the invasion of ambient atmosphere. The shafts of all augers can be hollow to permit conveyance of liquid feedstock, gaseous feedstock, or carrier gases into the operating environment or extract gases and volatized materials from the system.

Another important feature of the present invention is the use of abrasive materials in the vessels. Abrasive materials scrub the interior walls to prevent the accumulation of coke and cake, they abrade the feed stock particles as well as prevent clinkers from forming, and abrade the catalytic materials to clean them and thus avoid a condition known as catalytic poisoning.

One great advantage of the system and the process is the ability to reduce sulfur and chlorine contaminations in the produced products without regard for the contents of the original feedstock materials. These decontaminated produced materials may be, but are not limited to, crude oils, fuel oils, diesel fuels, fuels used in jet engines and turbine engines, and may be produced through the processing of contaminated fuels and other feedstocks, waste paint products and spent chlorinated solvents to name but a few.

Another use and benefit of this system and process is an ability to convert benzine-ring molecular forms into a straight-chain molecular form that is far less hazardous to both the population and environment.

Other features and their advantages will be apparent to those skilled in the art of waste chemistry from a careful reading of the Detailed Description of Preferred Embodiments, accompanied by the following drawings.

BRIEF DESCRIPTION OF THE DRAWINGS

In the drawings,

FIGS. 4A–4C illustrate different views of the wall of a horizontal or vertical chamber employing electrical resistive heating elements, FIG. 4A illustrating a partial, axial cross section of said members, and FIGS. 4B and 4C both illustrating partial, radial cross sections.

FIGS. 5A–5B illustrate features of two alternative, axial, schematic cross sectional views of the horizontal chamber, with both figures showing a two section chamber but FIG. 5A showing a section where the diameter decreases gradually and FIG. 5B where it remains the same diameter as opposed to FIG. 3 which shows a step reduction in diameter, FIG. 5C showing a slotted baffle plate, and FIGS. 5D and 5E showing front and side views, respectively, of a perforated baffle plate, according to a preferred embodiment of the present invention.

FIG. 6 is a detailed, cross sectional view of a support for a movable, horizontal chamber, according to a preferred embodiment of the present invention.

FIGS. 8A–8C illustrate the solids removal section of the horizontal retort chamber, according to a preferred embodiment of the present invention, with FIG. 8A being a longitudinal cross sectional view, FIG. 8B being an end view and FIG. 8C being a detailed view of the solid sweeps.

FIGS. 10A–10E illustrate a heat exchanger according to a prefered embodiment of the present invention, including FIGS. 10A and 10B, schematic cross sectional side and end views of a fin-tube type heat exchanger, and, FIGS. 10C, 10D, and 10E, a top, side and partially cut away perspective views of a spiral wound-type heat exchanger, according to two alternative preferred embodiments of the present invention.

FIGS. 11A–11B illustrates two preferred embodiments of a combination high-temperature packing gland, bearing and support feature of the invention with FIG. 11A illustrating a screw-adjusted variation and FIG. 11B illustrating a threaded-adjustment configuration.

DETAILED DESCRIPTION OF PREFERRED EMBODIMENTS

The system and process herein described uses feedstocks of solids, liquids and/or gasses in any combination or concentration thereof. Therefore, provisions are made for the conveyance of all three either individually or in combination into the system.

System Overview

Figure 1:
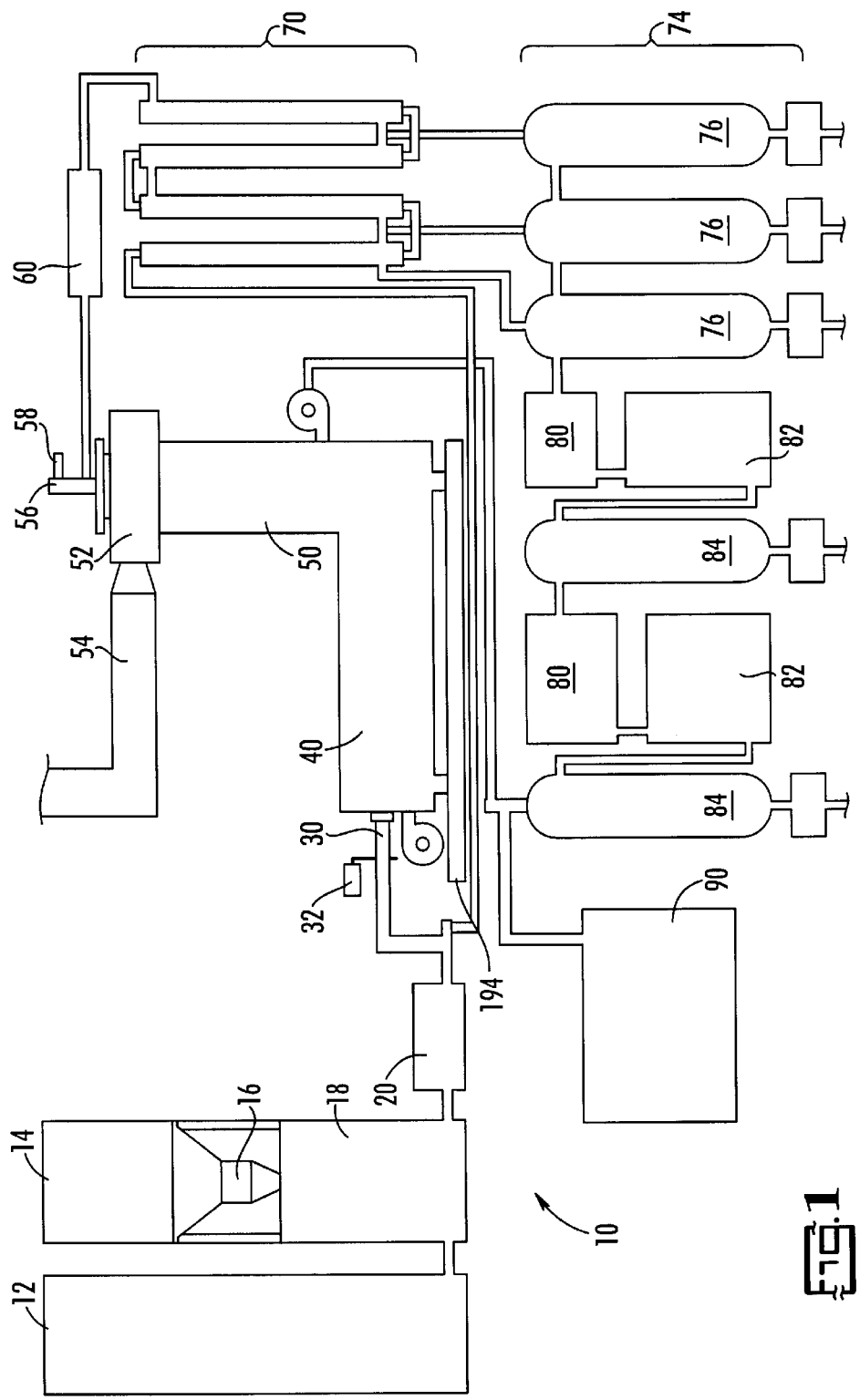
FIG. 1 is a schematic view of a feedstock material processing system, according to a preferred embodiment of the present invention.

Referring now to the figures, FIG. 1 illustrates on overview of a preferred embodiment of the present invention, generally referred to as system 10. A tank 12 is provided to store fluid feedstock materials. A hopper 14 is used to store solid feedstocks.

In the instance of only liquid-form feedstocks being processed, said liquid-form feedstocks are pumped directly from liquids feedstock storage tank 12 in FIG. 1 directly into system 10 without pre-processing.

In order to reduce the size of solids entering system 10, hopper 14 has a grinder 16, that is fed from hopper 14 by gravity and itself feeds into a blending tank 18 along with fluid feedstock from tank 12 where ground solids and fluids are blended to form a mixture for processing. Feedstock material is conveyed, preferably by pumping, into system 10 from tank 12 and hopper 14 via grinder 16 and blending tank 18 in such a manner that the ambient atmosphere is excluded from the interior of the operating system at all times.

From blending tank 18, feedstock is conveyed directly into system 10 or further processed by an optional slurry grinder 20. Slurry grinder 20 can be any device for forming a slurry from the mixture conveyed from blending tank 18, including, but not limited to, ball mills, rod mills, in-line high-speed grinder/blender units or any other means whereby a slurry consistency can be achieved.

Alternatively, the solids are conveyed directly into system 10 through a dry solids in-feed augering system 30, as will be described in more detail below. Augering system 30 is powered and rotated by a power source 32. Power source 32 can be of any nature including, but not limited to, hydraulic, electrical or mechanical sources.

From augering system 30, feedstock moves into horizontal retorting/processing chamber 40 and thence to vertical retorting/processing chamber 50, both of which will be described in more detail below. In chambers 40 and 50, the feedstock is broken down chemically.

The effluent from chamber 50 passes through an irradiation chamber 56, which additionally contains an internal catalytic source, where it is subjected to ultrasonic or electromagnetic energy provided by energy source 58 and thence passes out of the processing system and through an external catalytic unit 60.

From catalytic units 58 and 60, the effluent may optionally be directed to a fractional thermal recovery/condensation apparatus 70. In this event, the condensed and recovered products are taken off as they condense providing a means of recovering each fraction in its purest form instead of as a combined mixture.

An alternative of this form of construction of thermal recovery/condensation apparatus 70 is a fractional recovery system 74 in addition to thermal recovery/condensation unit 70.

These fractions are recovered in separate recovery vessels 76. Each of these vessels 76 has an individual pump (not shown) which is capable of extracting these produced products from either a positively or negatively influenced internal atmosphere.

Individual pumps are necessary due to combination gas compressor/vacuum pumps 80. One reason for these pumps 80 is the fact that the process described as taking place within the system can be carried out more efficiently under negative pressures, including, for example, a vacuum. This fact even extends to the breaking/reforming of molecules as well as thermal cracking. In the last instance it has been shown that the higher the processing pressures within any system the higher the required cracking temperature requirements. Thus the need for refinery pressures often in excess of 2,000 pounds per square inch and temperatures in excess of 1,500 degrees F. It has been shown that when most of the products recoverable by pressurization and condensation are recovered prior to a vacuum device a much smaller device is required.

Herein the function of maintaining system 10 under negative pressure is served by compression/vacuum pumps 80. Pumps 80 extract the un-condensed gases and compress them. They are then fed through compressible gas condensation/heat exchanger units 82. Here those gases which can be recovered as liquid petroleum gas or some variation thereof are liquified and under sufficient pressures delivered to their respective collection vessels 84.

In the present process, pumps 80 can be regulated so as to maintain a negative pressure of varying degree upon the interior atmosphere of system 10.

Those gases which are not readily recoverable by such means then go, under pressure and along with any "boil-off" from vessels 84 into a line supplying fuels for a co-generation plant 90. In co-generation plant 90, these un-compressible gases are used as fuel to generate electricity. This electric power is used first to supply the needs of the processing unit and its direct and indirect needs and the excess is sold for additional revenues.

In actual physical tests the constituency of said products will typically be 50–80% free hydrogen gas with most of the remaining gasses being butanes and its isomers, propane and its isomers and methane with the greater part being said butane/propane blends. During the recovery of those gases which can be liquified by compression and cooling most of these gases are removed leaving a product of almost pure hydrogen gas.

Therefore an alternate embodiment of this electrical co-generation feature is to utilize a readily available commercially manufactured hydrogen/atmospheric air fuel cell such as are readily available which would utilize the produced gases' hydrogen component as a fuel in order to generate electricity.

If not used in this manner, the excess gases can be used as gaseous fuels for the system furnace to supply required thermal energy for the operation thereof.

After these processes are finished the original feedstock materials are not only no longer identifiable in their original form, but no longer exist in any semblance of the original form and their original form cannot be identified from the final product.

Augering System

Figure 2A:
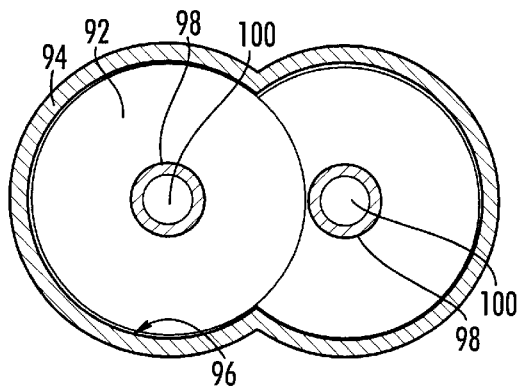
FIGS. 2A–2E illustrate views of the various features of an augering system, according to a preferred embodiment of the present invention, FIG. 2A being an interior exit end view, FIG. 2B being an interior entrance end view, FIG. 2C being an interior vertical view, FIG. 2D being an exit plate of the augering system, and FIG. 2E being an entrance plate, employed indexing gears, a microwave wave guide passage and various passages machined through said auger housing body.
Figure 2B:
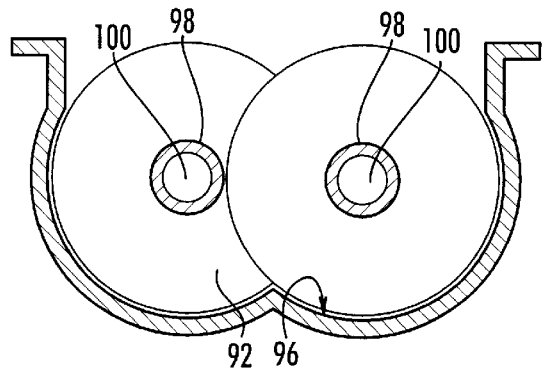
Figure 2C:
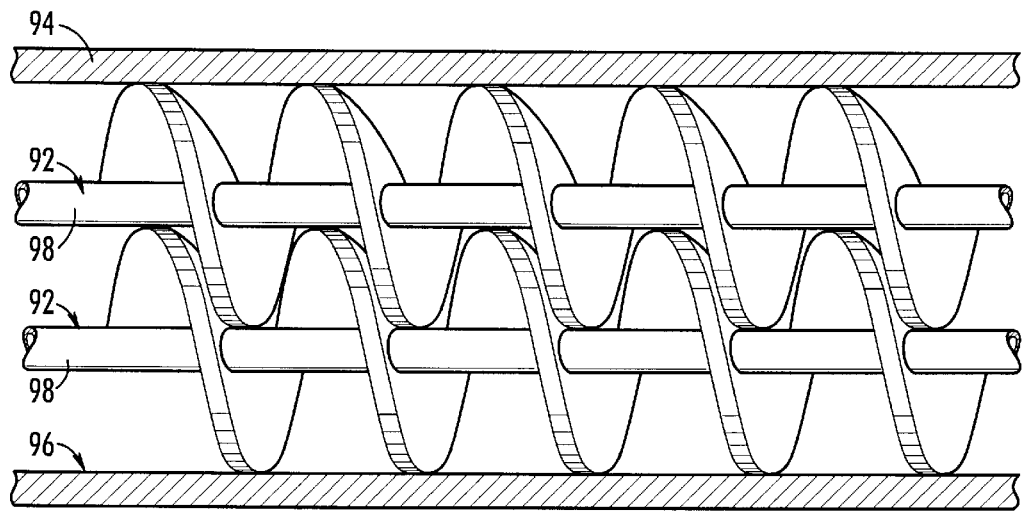

Referring now to FIGS. 2A–2E, augering system 30 is shown comprising an exit plate 34 (FIG. 2D) and an entry plate 36 (FIG. 2E) spaced apart from exit plate 34. Between plates 34, 36, are multiple, positive-displacement augers 92 (FIGS. 2A–2C). System 30 also consists of a housing 94 defining two or more auger channels 96 running from exit plate 34 to entry plate 36 within housing 94. In channels 96 repose two or more augers 92, one reposing within each channel 96. FIG. 2A is an internal view of auger system 30 from inside housing 36 from exit end 34; FIG. 2B is an internal view of auger system from inside auger system 30 from entrance end 36; FIG. 2C is an internal side view.

Augers 92 are made in a reverse configuration as shown in FIG. 2C whereby one auger 92 has a clockwise flite assembly while the other has a counter-clockwise flite assembly but both being preferably configured in the same pitch and diameter.

Each auger 92 is comprised of a flite assembly mounted upon or otherwise attached to a shaft 98 which is bored through from one end to the other in a continuous fashion forming through passages 100 to facilitate the passing of materials from slurry grinder 20 to horizontal chamber 40, as best seen in FIGS. 2A and 2B. Augers 92 are so disposed within their respective channels 96 that their flites are inter-lapped as shown in FIG. 2C.

Augers 92 are powered and rotated by in-feed power source 32 shown in FIG. 1. Power source 32 can be of any nature including, but not limited to, hydraulic, electrical or mechanical nature which turns either each individual or multiple auger shafts 98 directly. This turning, coupled with and subject the actions of gears 106 shown in FIG. 2E causes augers 92 to counter-rotate during operation. Counter-rotation, acting in concert with the configurations of augers 92 and their relative dispositions within auger channels 96 cause augers 92 to operate in a positive-displacement manner and thereby force the solids feedstock into horizontal chamber 40

Figure 2D:
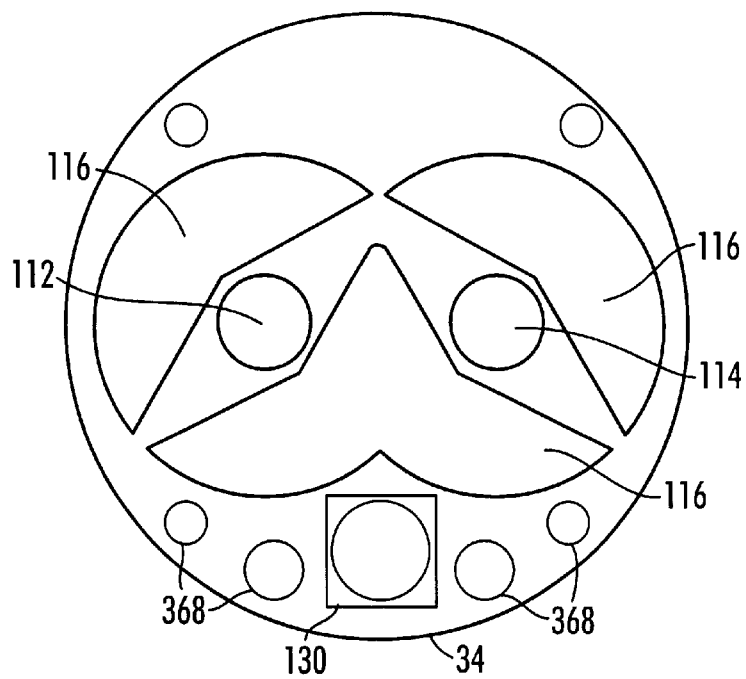

The interior ends of the augers pass through and rest in two holes 112, 114, drilled in a exit plate 34 shown in FIG. 2D which is mounted upon the end of auger housing 96 within the horizontal retorting/processing chamber 40. As augers 92 operate in a manner described above, in-coming feedstock is augered through single or multiple drilled and/or machined shear holes 116 in exit plate 34 where the material is sheared off in a positive manner and allowed thereby to fall into the interior of chamber 40.

Additionally to said above described angering system 30, an ultrasound and/or electromotive force wave guide, 130 (FIGS. 2D and 2E) is machined into and through the longitudinal axis of said in-feed assembly 30 in order to introduce said beneficial processing forces into the horizontal vessel 40.

In order to seal rotating and or moving components of the system and isolate the interior of the system from the ambient exterior atmosphere, combination high temperature packing gland sealers, high temperature bearings and supporting members are incorporated into said packing gland assemblies as shown in FIGS. 11A–11B. FIG. 11A illustrates an embodiment of said combined assemblies which is adjusted by the employment of screw assemblies while FIG. 11B illustrates a comparable assembly which is adjusted by the employment of a threaded adjustment configuration.

In operation a rotating or moving component of the system, such as an auger shaft 92, FIG. 2C passes into packing gland component 120, FIGS. 11A & 11B through passage 360 and into a packing gland material 362 which is a compressible high temperature material such as, but not limited to, graphite foil. Thereafter said auger shaft 92 is sealed and supported by the expedient of tightening the adjustment components 364 in FIG. 11A and 366 in FIG. 11B, thus compressing high temperature packing material 362 and sealing the assembly. Due to the physical nature of said high temperature packing material 362 a seal is formed as well as a self-lubricating bearing surface being established which permits rotation or movement of the component secured therein without permitting leakages from the system.

Figure 2E:
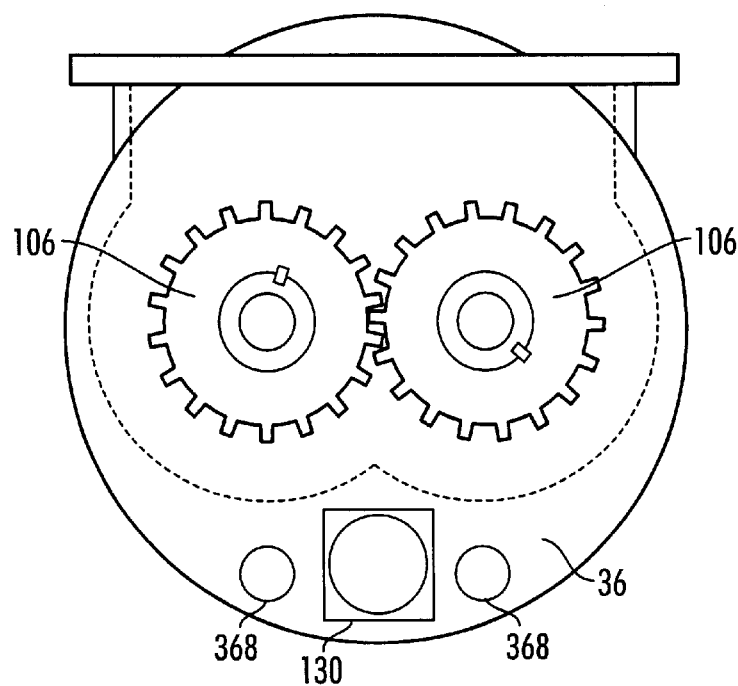

During operation the above mentioned feedstock slurries can be introduced through the augering system 30 itself or pumped through passages 100 of any of the hollow auger shafts 98 or through passages 368, FIGS. 2D & 2E provided therefor.

Another embodiment of an in-feed system would be the utilization of a pre-processing grinder or other means of size reduction coupled with a previously described solids/liquids blending system and employing a form of positive displacement or pumping device such as a flexible geared positive displacement pump, a progressive cavity pumping device, or any other means of positive displacement material transfer device, or any combination of the above.

Likewise the liquid or gaseous materials, whether feedstock or carrier gasses, can be introduced through hollow shaft 98 of any auger herein and/or through any of several passages 100 machined or drilled through auger shaft 98 or passage 368 of FIGS. 2D–2E provided therefor.

These carrier gases are neither preferably nor necessarily intended as reactionary feedstock in the process or the system, even though they might be so, but rather to facilitate the movement of the processing components through the system while they are in their gaseous volatile forms. This expedient is necessary only when the process itself does not produce enough finished gaseous material, as said process is conducted, to facilitate this purpose.

Figure 3:
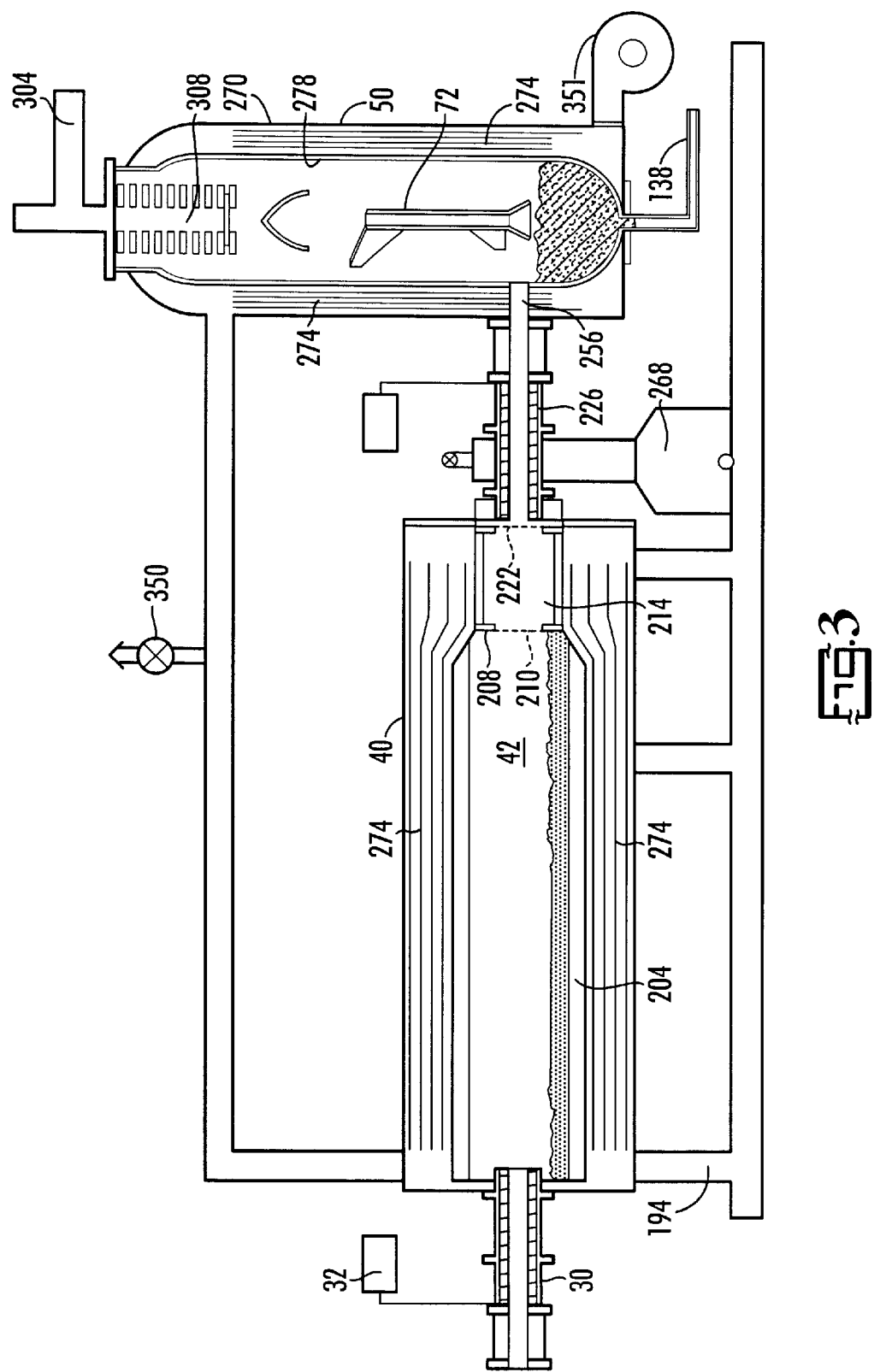
FIG. 3 is a schematic, cross sectional view of horizontal and vertical retort/processing chambers, according to a preferred embodiment of the present invention.

Another entrance into the processing system is through a vertical retorting/processing chamber 50 through the injection system 138 (FIG. 3). Injection system 138 introduces gaseous, liquid and/or slurry feedstock into the lower portion of said vertical retorting/processing chamber 50 within the fluidized bed therein.

Horizontal Retort/Processing Chamber

Referring to FIG. 3, inside horizontal retorting/processing chamber 40, the feedstock materials are driven into the fluidized bed 42 by augering system 30. As will be explained below, chamber 40 is movable; chamber 50 is not. This fluidized bed material consists of, but is not limited to, catalysts, abrasive materials, feedstock debris being processed and newly introduced but thus far un-volatized feedstock components. Fluidized bed materials are heated to a desired processing temperature by either a combustion furnace arrangement or by electrical resistive components 134, or by any other means whereby said materials might be heated.

Employment of electrical thermal components 134 are further described as follows: a retorting/processing vessel 40 intended for electrical resistive element heating, whether a vertical or horizontal component, is first machined with grooves 140 as shown in FIG. 4A, which are configured around the outside circumference of the wall 46 of chamber 40 in a spiral configuration. Grooves 140 are configured so as to most closely conform to the exterior shape, configuration and form of the electrical heating component 134 in use and are spaced so as to achieve any desired thermal density possible with the chosen components. On each edge of each machined groove 140 is machined a crimping groove 142 in the form of a shallow channel running parallel and lateral to the linear axis of groove 140. A crimping element ear 146 is swaged over the edge of the electrical heating component 134 after it is swaged into groove 140 so as to most closely conform to the interior configuration of groove 140 and thereby maintain as intimate a physical contact with wall 46 as possible.

The interior surfaces of grooves 140 are coated with an appropriate volume of Very High Temperature Thermal Transfer Coating (VHTTTC) so as to promote maximum thermal transfer from the electrical heating components 134 into the walls of the chamber 46. Grooves 140 thereafter have electrical heating components 134 wound into them so as to more-or-less conform to the overall desired configuration.

The whole assembly is passed through a swaging procedure whereby the electrical heating components 134 are swaged firmly into respective grooves or channels 140 and crimped into place. This swaging and crimping procedure is performed for the dual purpose of producing as intimate a contact of said electrical heating component 134 to the interior surface of groove 140 as mechanically possible so as to maximize thermal transfer from component 134 to wall 46 of chamber 40.

This swaging procedure coupled with the use of VHTTT Coating in grooves 140 is shown by experience to produce a unit wherein thermal transfer approaches that which could be expected if the electrical heating elements were manufactured as an integral part of the chamber wall.

As this previously described swaging/crimping procedure is conducted, the crimping element ears 146 formed between groove 140 and crimping groove 142 are swaged over the edges of the component 134 so as to secure and hold a swaged component 134 in place during operation. This, along with the VHTTTC, maintains the intimate contact of component 134 with groove 140's interior surface, prevents thermal buckling or movement of component 134 within groove 140 and promotes maximum thermal transfer of all available thermal energy into chamber 40 and system 10.

Over the outside surface of the thus-configured chamber 40 is placed electrical thermal strip clamping bars 150. Clamping bars 150 are held in place with threaded bolts 152 fitting into holes bored through them and into, but not through, exterior wall 46 of chamber 40 with the borings into the chamber wall being threaded so as to receive bolts 152.

Electrical components 134 are not in a continuous form from one end of a chamber 40 to the other. Rather, they are several in number according to the size of chamber 40 in question and the design requirements of that particular application. In this manner can be established and maintained a thermal gradient within any respective chamber 40 or 50 by the simple expedient of switching each component 40 on or off as required, the manner and purpose of a thermal gradient being revealed hereinafter.

A device shown in FIG. 4B depicts a thermal scanning device 160 which detects the temperature of the surface of wall 46 of chamber 40 in a specific location thereon and is used to monitor and control temperatures for optimal processing purposes.

Another embodiment of thermal detection, illustrated in FIG. 4A, is employment of thermocouples 164 or any other intimate-contact thermal detection device or devices attached to wall 46 of chamber 40. Thermocouples 164 monitor the temperature of chamber 40, supply data to controlling devices, or perform many other desirable functions.

Electrical energy is supplied to said electrical thermal electrical resistive thermal components 134 by any of varied means, with one such means being shown in FIG. 4C through components 134, but said means are in no way limited to those described herein.

Applied over wall 46 of chamber 40 is an electrically insulating layer 168. Outside insulating layer is an electrical contact layer 170, made of any material that will conduct electricity as well as stand up to continuous contact with electrical brushes 172, housed within a holder 174 and are spring-loaded so that brushes 172 maintain contact with electrical contact layer 170 on the outside surface of wall 46. Electrically insulating layer 168 helps to prevent the shorting of the introduced electrical energy and thus avoids dangerous conditions. Spring loading can be achieved by use of spring arms, spring loaded metal bars, magnetic contacting elements, and many other means.

Contact can be maintained in a stationary member's electrical thermal strips by direct contact or any other acceptable means commonly used in the commercial electrical industry.

An alternate construction of both the vertical and horizontal retorting/processing chambers 40, 50, is shown and described as follows. In a combustion furnace type heating means, thermal energy is supplied by any of a variety of combustion elements affixed to a furnace plenum of any design and attached to or incorporated into the design and construction of said chamber.

Retorting/processing chambers 40, 50, whether vertical or horizontal, or in any other position, are configured in any manner of variations so as to maximize the collection and transfer of available thermal energy into the system. In the presented configuration this is done by means of maximizing the total surface area of each component 46 of system 10.

Two variations of a configuration of a horizontal or vertical chamber 40 are revealed in FIGS. 5A and 5B. One embodiment is in the form of a straight-sided chamber 40" (FIG. 5B) while the second is that of a step-sided configuration 40' (FIG. 5A) which has a variation in chamber diameter along the longitudinal axis of chamber 40', 40". The variation in diameter is in the form of a sloped or tapered transition 180, as shown in FIG. 5A, or a curved transition or a straight transition 182 in diameter as shown in FIG. 5B.

Either version of chamber 40 is constructed so as to be able move about its respective horizontal axis in either a rocking motion which means chamber 40 does not complete a full circular path or in a full and continuous revolution. To effect rocking or rotational motion, a supporting system 190 shown in FIG. 6. In this embodiment a set of high temperature bearings 192, are mounted upon a supporting framework 194 such as shown in FIG. 21. Bearings 192 can be mounted in a manner shown wherein a bearing mounting block 196 enables a bearing support yoke 198 to ride upon a spring 200 which pushes bearing 192 toward chamber 40 and maintains contact with chamber 40.

There are many alternate embodiments of a support system which can be readily employed by those skilled in related arts thereof.

In the shown embodiment a bearing yoke is allowed by adjustment to travel in a manner shown which upon being loaded with the weight of the retorting/processing chamber will bottom out on the support framework and bear a full proportional weight of said chamber.

Either embodiment, or other forms of said embodiment as will be evident to those skilled in the art of rotating or rocking reaction chambers, can be used in order to achieve this same or comparable result.

Shown in both revealed embodiments of chambers, 40, 50, are several components common to both and to all others herein revealed. First is revealed a manner for lifting and stirring the fluidized bed components as a retort chamber 40 moves in a rotational motion upon its longitudinal axis. These elements 204 are of a construction as shown in FIGS. 5A and 5B and in end view of vessel 40 in FIG. 7A. The purpose of these elements 204 is to maintain a constant turning and mixing of the fluidized bed components during operation.

Additional embodiments are that said lifting and stirring elements 204 are placed within a vessel in forms of an inclined spiral, alternatingly reversed spiral or any other configuration so as to achieve or impart a lifting, blending, mixing or dropping motion to the elements of a fluidized bed, a catalytic bed or matrix, or of processed/precessing feedstock materials or abrasives Stirring motion contributes several benefits: First, catalytic components of the fluidized bed are enabled to remain in constant contact with the materials being processed.

Secondly, a constant turning and agitation of fluidized bed components promotes the constant abrading of solid particles of feedstock material so as to expose an interior surface of particles to reaction by the process.

Thirdly, this action limits the contact of the interior heated wall 46 of chamber 40 with any raw or semi-processed feedstock material and thereby preventing formation of a coking buildup on said interior surface of wall 46. A constant motion and abrasion by the components therein enables an abrading away of any coking material which otherwise forms upon the interior wall 46 of chamber 40 thereby solving a coking problem which has plagued previous processing attempts by others.

A fourth benefit of this action is that the catalytic materials are constantly subjected to a scrubbing and abrading action upon their surfaces thereby constantly cleaning said surfaces and effectively preventing a condition known as catalytic poisoning so common within such systems but absent within this system.

A fifth benefit of this fluidized bed utilization is that by this constant motion of the components there is set up a form of hydraulic horizontal displacement through a horizontal chamber whereby the introduced feedstock is moved horizontally through chamber 40 without the requirements of inclining chamber 40 from its horizontal axis, the requirement for any moving means of conveyance through chamber 40 such as paddles, augers, or any other means whatsoever within the heated areas of the vessel.

Said hydraulic horizontal displacement is achieved by the introduction of any amount of feedstock into chamber 40 and thereby producing a hydraulic "head" in the system at the point of introduction. Since the materials in this fluidized bed system act in accordance with the laws and practices of fluid dynamics and gravity, the newly-introduced materials will build what amounts to a dynamic head in the introduced area. This will be leveled out by a combination of gravity and a fluid-like characteristics of the fluidized bed. This leveling out, which is very like pouring a fluid into one end of a full container and thereby, according to the laws and practices of fluid dynamics, forcing an equal amount of fluid out the other end of the container, will constantly laterally displace the materials in the fluidized bed away from the introduction point and toward the solids extraction area located in the other end of the vessel, as will be described herein.

Due to the differentials in the specific gravities of the catalytic components and that of the components and residue of any feasible feedstock material, the self-leveling nature of the fluidized bed components enables the catalytic components to remain more-or-less in place while the feedstock materials components are forced to migrate through them and the vessel.

This phenomenon, coupled with the positioning of augering system 30 upon one end of horizontal chamber 40 while placing the burners/combustion components 134 toward the other end of the chamber 40, produces a thermal gradient and thermal counter-flow phenomenon. Thereby, the materials being processed, while migrating through the precessing environment as described above, are constantly exposed to increasingly greater levels of temperature. This condition, coupled with the constant exposure to the actions of the catalytic components under the influences of the fluidized bed, allow the processing to continue within the one vessel instead of many as required by other processes.

Those elements of the feedstock which could be processed and recovered by the simple expedient of distillation and pyrolysis will be volatized at that point in the system where they encounter those conditions of temperature, availability of thermal energy and interior atmospheric conditions which will allow those processes to take place.

These volatized components will then exit the system for recovery without further processing and/or conversion therein.

In practice, it has shown that if a particle will not react and be processed at the lower temperatures near the feedstock injection point, it will remain in its original state while traversing that area of the vessel. However, when said particle reaches that area of the vessel where it encounters a particular temperature at which it will react, through the combined influences of the thermal energy available, the catalytic elements present and other conditions peculiar to the interior processing environment, then that particle will react in the desired prescribed manner and be processed according to the design of the system. At that point the material will be transformed into a volatized state and will exit the processing area without further processing, conversion and/or modification of its molecular chemical nature.

In this process there is a requirement for free molecular hydrogen in order to complete the process and the prevent retrogressive condensation reactions. This is a constant problem encountered in pyrolysis. In retrogressive condensation reactions, organic or inorganic long-chain molecules are broken by some means such as thermal or catalytic cracking. As this phenomenon progresses, some of the shorter-chained molecules attach a hydrogen atom at the produced break and thereby complete and stabilize into their new short-chain molecule form and can be recovered in their more desirable forms.

However, without the availability of additional hydrogen atoms the remaining unstable remnants of this process are forced to unite with other long-chain remnants into increasingly complex and ponderous long-chain molecules. This can be both a desirable and an undesirable condition.

The desirable condition would, in one instance, result in the conversion of methane gas into gasoline or some other desirable liquid fuel component. This can be achieved in this system through the expedient of processing this gas by itself wherein the retrogressive condensation reaction is promoted in order to break the methane molecule into its carbon and hydrogen components and then re-assemble these components into a C6 or greater molecule and combining the remaining hydrogen atoms into hydrogen gas molecules as H2 and recovering it or use it for further processing.

The undesirable results of this condition is the production of ever-increasingly long molecular structures of correspondingly decreasing desirability.

Therefore another expedient is to co-process methane gas, or any other gaseous hydrocarbon material, with the afore mentioned long-chain hydrocarbon molecules and use the excess hydrogen produced in the process to complete and stabilize the shorter-chained molecules in a desirable state.

This part of the process is achieved by the employment of microwave, maser, laser, and/or ultrasound energy introduced into the processing system. These energies have shown themselves able to more easily break molecular bonds that otherwise would be almost impossible to disrupt and break.

Without wishing to be bound by theory, it is believed that application of electromagnetic radiation or other forces such as ultrasonic vibrations, the covalent bonds of the molecules of the materials in question will dissociate more readily, including doing so more readily in the present of catalysts as well. In general a single electrical bond is stronger than a double bond which is in turn stronger that a triple bond when exposed and subjected to said influences. In this manner likewise, electromagnetic radiation and ultrasonics can be used to selectively break, for example, carbon/carbon and carbon/sulfur bonds as well as bonds involving sulfur, chlorine and/or fluorine involved with other atomic elements.

Therefore this invention has shown itself, especially when used in concert with the above described physical system, to safely process such diverse materials as used tire rubber, plastics, chlorinated solvents, pesticides and many other materials of like molecular constitution. These resulting liberated elements are then recovered and rendered safe by the simple expedient of including ground up aluminum, zinc or any other scavenger or highly reactive materials into the feedstock. In system 10, with the thermal and other conditions adjusted appropriately, this gas rapidly reacts with these scavenging metals and is captured for later recovery and use by industry. It also prevents the formation of conditions which are extremely corrosive to system 10. The resulting acquisition of additional thermal energy from said electromotive or ultrasonic system components is an extra benefit but is not the primary reason for their use.

Another means for the production of free hydrogen within the system for the reasons described above is the employment of a modified coal-gas reaction. In this case water is added into the feedstock so as to achieve a moisture level of 8–12% by weight. This water, when introduced into the system instantly reacts in the classical coal-gas reaction with the available carbon which would otherwise be recovered as carbon black or char material. This reaction provides the additional benefit, especially in vertical chamber 50, of removing carbon residues from the fluidized bed materials, the vessel walls and the operational atmosphere.

This reaction produces carbon monoxide, a fuel gas, and free hydrogen for the previously described reactions. It is classified as a non-electrolysis production method. It is promoted upon a greater-than-expected scale due to the conditions within system 10.

This capability allows the described invention to utilize what would otherwise be waste water from the process or water contaminated with hydrocarbon materials such as petroleum products or oils originating elsewhere. In a purely pyrolytic system there is always produced some measure of extremely contaminated waste water which then must be disposed of in some manner. This system, however, simply converts the waste water into processing components and recovers the contaminants as produced products.

After the incoming feedstocks are processed as described and revealed above, any remaining un-processable materials such as small stones, ash, decontaminated dirts and soils or unused carbon black migrate to the end of the horizontal vessel where they encounter ever-increasing temperatures which are above those required for any reasonable expectations of further processing and conversion.

Here, these materials reach a solids residue spill-over ledge as shown 208. The purpose of spill-over ledge 208 is to hold the elements of the fluidized bed in place and at a desired depth during operation. As the residual materials reach the necessary depth, the excess, pushed by the fluid dynamic actions previously described, will spill over the top of ledge 208. At this point the residues will encounter a slotted baffle plate 210, as shown in FIGS. 5A–5C. The purpose of plate 210 is to maintain the catalytic materials within the reaction portion of camber 40 (40', 40") while allowing the residues to escape into the solids residue crusher chamber 214. In chamber 214 of the chamber 40, the residual materials will encounter a tumbling action imparted upon it by the movement of the vessel and the utilization of a number of paddles 216. The lifting and tumbling of paddles 216 continuously mix and blend the residual materials while at the same time subjecting them to the crushing action of balls, rods, or other means of crushing the particles into dust.

In this manner, particles still harboring processable materials within the particle will be reduced through crushing and said materials exposed to the vessel's environment and processed. The employment of catalytic components in these crushing elements further promotes complete processing.

Residue crusher chamber 214 is also the area of chamber 40 with the highest degree of thermal energy being applied as previously described above.

Upon finishing the transit of residue crusher chamber 214, the remaining materials encounter a processed residue spill-over ledge 220 serving the same purpose as ledge 208. Attached to ledge 220 is a perforated baffle 222, as shown in FIGS. 5A, 5B, 5D and 5E. The purpose of baffle 222 is to retain the processed residues within the crusher portion of chamber 40 until it is pulverized into a fine, dry powder.

This perforated plate is shown in greater detail in an end/face view shown in FIGS. 5D and 5E. In these views, perforated plate 222 is shown having a perforation pattern which would retain the catalytic crusher materials within the crusher area while allowing the finely crushed residues to filter through the perforations.

FIG. 5E shows a cross-sectional view of a portion of perforated plate 222. This view shows a beveled or rebated area on the back side of the perforations of plate 222. Plate 222 has this particular embodiment for the purpose of preventing the clogging of the perforations by impacted solids residue materials within the perforation channels.

The testing of this engineering has shown that once a particle is forced through the front of a perforation by the hydraulic movements described, and further being subjected to the obtuse pounding of the crusher elements, it then encounters an area greater in cross-sectional area than that through which it has just passed and will fall to the other side by gravity as well as by being displaced by the force of following material particles.

Once through perforated plate 222, the residues enter the solids extraction section 226 of said horizontal chamber 40 as shown in FIG. 8A.

In the embodiment described and revealed in FIG. 8A, solids extraction section 226 consists of an end plate 230 which serves to close one end of the chamber 40 and rotates or rocks along with chamber 40.

Attached to end plate 230 is welded or otherwise affixed a rotating/moving auger channel 232 which is a pipe-like member and a set of solids exit port sweeps 236 shown in FIGS. 8B and 8C, these being securely affixed to or a part of the end plate 230 and moving with and as a part of plate 230.

Moving auger channel 232 is open at an exterior end 238 and closed at the interior end 240 except for a hole 244 centered in this closure which is bored through on the center and pierced thereby with a hole 246 of sufficient size and diameter so as to allow the protruding end of the solids extraction auger 250. A shaft 252 of auger 250 is bored through on its longitudinal axis so as to form a passage 256 within shaft 252 to allow for fluid or gases to pass into or out of the chamber 40.

The solids extraction section 226 also has a stationary auger channel 260 inside the movable auger channel 232 as shown in these drawings. Movable auger channel 232 moves in concert with the horizontal chamber 40 while said stationary auger channel 260 residing within remains immobile and extraction auger 250 rotates within stationary auger channel 260. Stationary auger channel 260 has machined into it an entrance port 262 through which port drops the solids as they are picked up by the solids sweeps 236 during the rotations of shaft 252 and when solids entrance port 262 in the rotating auger channel 236 aligns with hole 244.

This action drops and deposits the residues into stationary auger channel 260 wherein resides the solids extraction auger 250 which turns within stationary channel 260 by such a means as described heretofore in FIG. 6.

This rotational motion of the solids extraction auger 250 within stationary auger channel 260 moves the dry solids residues to at a point of termination of the auger flites as shown in FIG. 8A where the extracted solids are accumulated above another set of solids extraction ports 264 machined in both stationary and moving auger channels 260, 232, respectively, so as to open due to a movement of the movable auger channel and the stationary nature of the stationary auger channel. When said alignment occurs, the extracted solids are thereby allowed to drop out of their solids extraction section 226 and exit chamber 40.

At this point, the super-heated solids residues drop into a solids residue recovery chamber 268. From there they can be recovered after cool-down or run through a combustion chamber enabling the super-heated carbonous residues to be consumed by auto-combustion due to their elevated temperatures and their exposure to the atmosphere. Heat of this combustion can be used to supplement the thermal requirements of the unit or any other requirement of thermal energy. In several experiments and tests it has been shown that the thermal energy thus produced can be sufficient to furnish substantially all of the requirements of the system 10.

Alternatives for use of this material is recovery as a carbon black, collection and pelletizing into a direct substitute for high-quality, low sulfur coal fuel, and other uses.

Any remaining residues which might require disposal can be solidified and stored for later sale and/or processing.

Thermal Efficiency Measures

The described process is conducted through the application of catalysts and thermal energy. The rate of processing is governed by the quantity of thermal energy available inside the system: the more thermal energy available, the higher the processing rate in units of feedstock versus time.

There is also the consideration that although fuel for providing the heat for this apparatus is produced by the output product, the economics clearly indicate that the less product expended for fuel, the more product that remains for sale. Therefore it is imperative that all thermal energy produced be conserved to the greatest degree possible.

Thermal conservation reduces operation costs and increases profits as well as reduces thermal pollution.

The manner used to accomplish thermal conservation and recovery is shown in the drawings of a chamber 270 which represents both horizontal chamber 40 and vertical chamber 50. Heat recovery is related to the fact that the more surface area exposed to a thermal differential the more thermal energy can be transferred. Therefore, chamber 270 with any type of increased surface area will be more efficient at thermal transfer than one with less surface area. To this end the presently revealed invention clearly shows two methods thus far used with great success to accomplish this end.

Figure 7A:
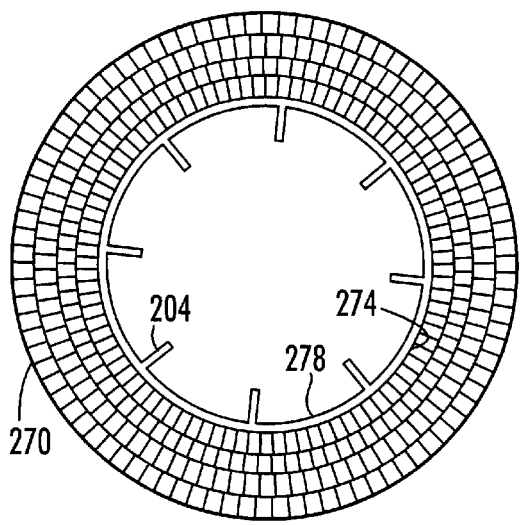
FIGS. 7A–7D illustrate the modification of horizontal and vertical chambers to permit heat recovery according to a preferred embodiment of the present invention, with FIGS. 7A and 7C being two alternative embodiments of the modification and FIGS. 7B and 7D being detailed views of the embodiments of 7A and 7C, respectively.
Figure 7B:
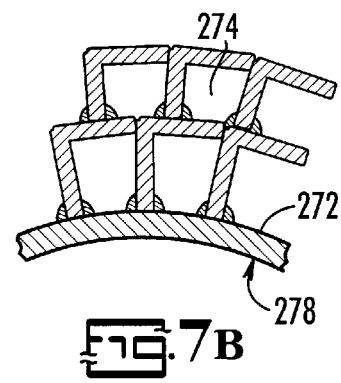
Figure 7C:
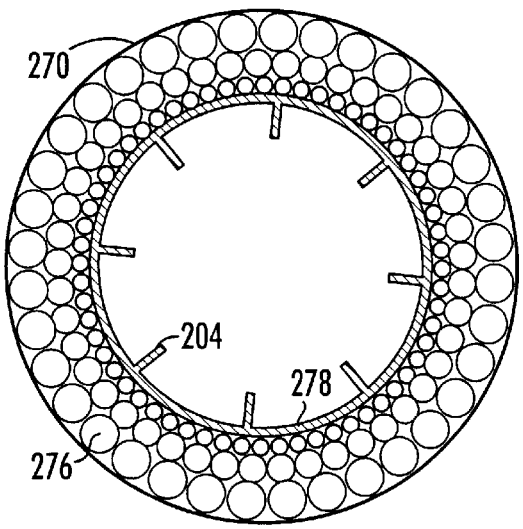
Figure 7D:
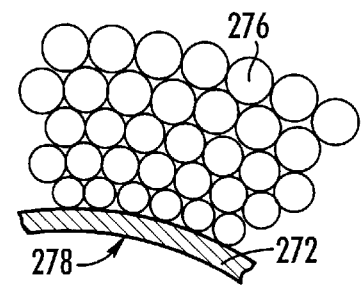

FIG. 7A shows a cross-sectional view of chamber 270 to the wall 272 of which multiple layers of metallic angle stock have been welded in order to form more-or-less square tubes 274 which lay parallel to the longitudinal axis of the chamber 270. FIG. 7C shows circular tubes 276 have been attached to chamber 270. FIG. 7D shows a greater detailed view of the same form of construction. In this manner the surface area exposed to a thermal differential is increased several hundred fold and the rate of thermal capture and transfer is increased to a like degree.

The manner of employment is thus: a series of above described elements are welded or otherwise fixed to the outside surface of chamber 270. It is essential that all joints of whatever nature be continuous and of sufficient cross-sectional area so as to be able to safely transfer all available thermal energy into a wall of said vessel without said vessel wall being distorted by thermal shock.

The rate of thermal transfer at any point along the linear axis of the vessel can be controlled by the variations in size and thickness of the construction material used to produce these elements.

During operation the flames and heated furnace gases travel down the length of the tubes 274, 276, above described. This thermally laden medium transfers the thermal energy according to the surface area exposed and the temperature gradient of the collector material. And at a rate relative to the velocity of the thermally laden combustion gases.

Since the process feedstock is introduced at the end of the vessel farthest away from the furnace and progresses toward the furnace end of the vessel, a condition of thermal gradient and thermal counter-flow is established and maintained. The thermally laden gases cool as they progress down the tubes by transferring their energy into the system.

In this manner, in repeated actual tests, it has been established that a burner of 250,000 B.T.U.'s per hour production capacity burning at over 2,000 degrees F. can be expected to transfer enough thermal energy in such a system that at a distance of only 36 inches the exhaust temperature remains at only 85–86 degrees F. This is due entirely to the efficiency of the thermal energy capture and transfer in this system.

Vertical Retort/Processing Chamber

Due to all the above, during processing there is an appreciable volume of volatized material exiting horizontal chamber 40. This material can be recovered at this point or can be further processed in vertical retorting/processing chamber 50.

This unit is constructed much like the previously described horizontal chamber 40 with several exceptions. First, vertical chamber 50 is mounted in a stationary manner upon frame 194 (FIG. 1) common to both the vertical and horizontal vessels 50, 40, respectively.

As shown in FIG. 3, vertical chamber 50 is composed of an outside shell 270 a set of vertical thermal recovery tubes 274 or 276 as shown FIGS. 7A–7D, a wall 278, a furnace plenum ring 52 as shown in FIG. 3, and other operational featured herein disclosed.

During operation the horizontal chamber 40 can give its produced volatized gases into the thermal recovery/condensation unit or into vertical chamber 50 as shown through passage 256 in shaft 252, as shown in FIG. 8A. In addition, unprocessed feedstock can be introduced into the vertical vessel by means of the vertical vessel injection system 138 as shown in FIG. 3. This injection point introduces the feedstock directly into vertical vessel 50's fluidized bed shown in FIG. 3 where it is almost instantly volatized or converted by the thermal energy present, the catalytic action of the fluidized bed and/or the irradiation of the microwave unit to be described.

As in horizontal vessel 40, a thermal gradient is maintained along vertical vessel 50. However, there is little or no thermal counter-flow involved in this section except as is produced by the reflux action herein described. The thermal gradient is maintained solely by the furnace and the thermal collection tubes 274, 276 as shown in FIGS. 7A–7D.

Establishment and maintenance of this thermal gradient is essential to the operation of this section of the system in that it controls the quality and composition of the produced products.

This is accomplished by the following means of operation: The volatized materials, whether produced within vertical chamber 50 or transferred from horizontal chamber 40 rise through the interior atmosphere maintained by the thermal gradient within the vertical chamber 50. The thermal gradient enables the volatized materials, which have a condensation temperature specific to their molecular structure, to condense or not to condense at specific points within the vertical column defined by vertical chamber 50.

As an example, if a component that condenses at 250 degrees F. is desired but a component which will condense at 275 degrees F. is to be excluded from production, then the thermal gradient can be maintained so that the upper region temperature of vertical chamber 50 is maintained at approximately 265 degrees F. In this manner, due to this factor and the ability of the carrier gas to push the volatized materials through system 10, the desired component will be able to exit the processing system and be recovered by condensation. But the undesired component will reach that point within vertical chamber 50 where it encounters a temperature low enough that it will no longer remain in a gaseous form and will condense and fall back into the interior of vertical vessel 50 where it will be further processed until such point that it is able to exit system 10 in its modified/converted form.

In this manner the produced product quality can be regulated to a very close tolerance.

The further processing is enabled by the thermal energy present, the actions of the catalytic fluidized bed and the electromotive energy previously described.

Figure 9A:
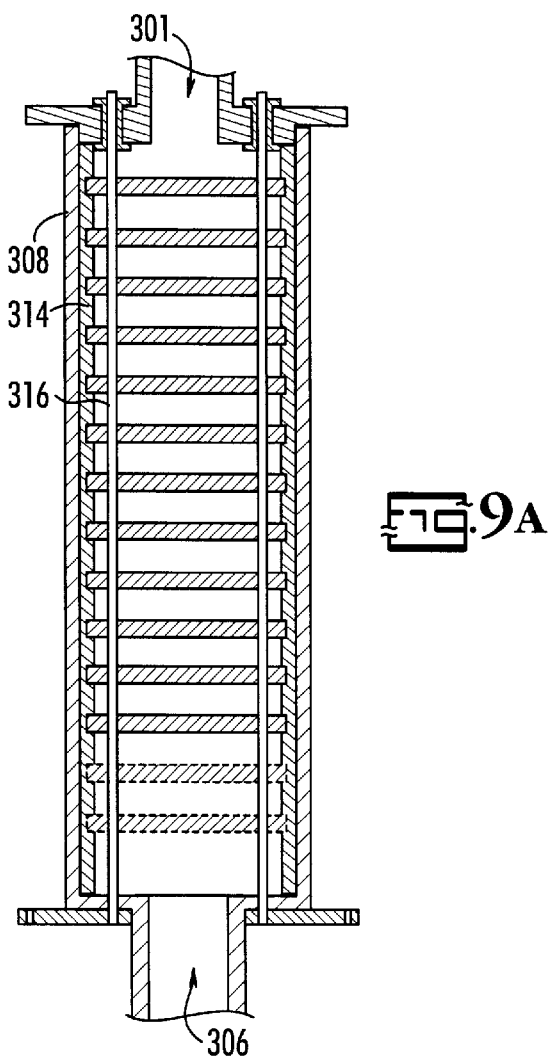
FIGS. 9A–9D illustrate the catalytic unit according to a preferred embodiment of the present invention, including FIG. 9A which is a side cross sectional view, FIG. 9B which is an end, cross sectional view, FIG. 9C which shows schematically, the control of the Power supply, and FIG. 9D which illustrates a preferred embodiment of an electromotive irradiation system, including a catalytic plate system such as is employed within a vertical retort/processing vessel.
Figure 9B:
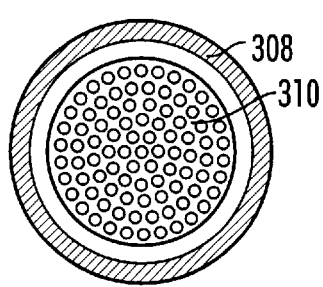
Figure 9C:
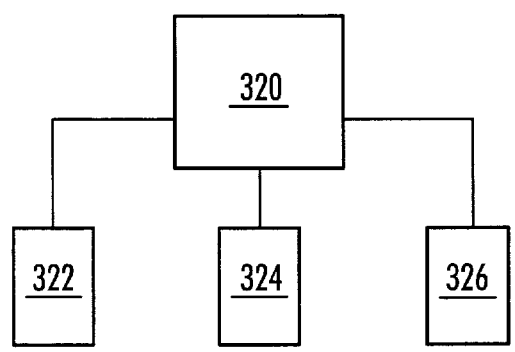
Figure 9D:
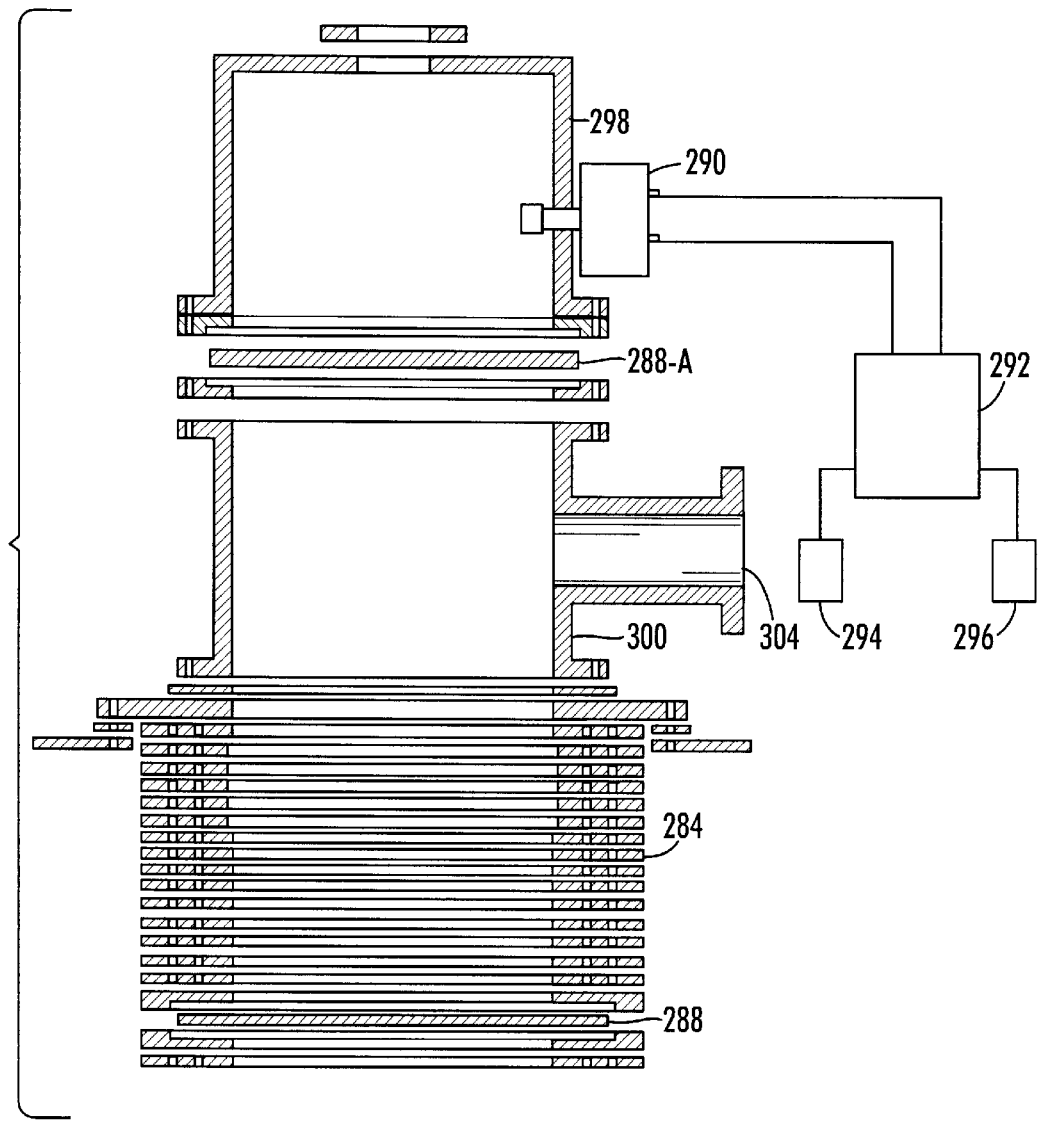

As the volatized component rises into the upper regions of vertical vessel 50, it will pass into an electromotive irradiation system 308 (FIG. 3) bolted to the vertical vessel 50's mounting flange, as shown in detail in FIG. 9D. The volatized gases pass between a set of catalytic plates 284. Plates 284 are in the form of spaced, perforated rings, either square or round (round rings shown in FIG. 9D). The spaces between plates 284 define slots through which gases may pass from one plate to another. The catalytic plates can be either electrified as shown in FIG. 9A or can be passive in nature. Plates 284 are suspended and positioned by insulated rods (not shown in FIG. 9D for clarity) or alternatively, or by being pressed into a central perforated cylinder along with an insulated holder, or, if intended only to be passive during operation, then by either means but without the necessity of an insulated rods or an insulated holder.

The volatized components are forced to pass between plates 284 by the expedient of being blocked otherwise by the lower very high temperature gas barrier plate 288 as shown in FIG. 9D. Catalytic plates 284 and the upper very high temperature gas barrier plate 288 act as seals which exclude gases while admitting the passage of microwave energy into vertical vessel 50. This microwave energy is supplied by the magneton 290 shown in FIG. 9D which is controlled by the power supply 292. Power supply 292 in turn is controlled by a microwave power generator frequency controller 294 and a pulse-width controller 296. Microwave magneton 290 is mounted upon a wave guide channel 298 and this component mounts upon a lower microwave wave guide 300.

After the volatized gases exit vertical chamber 50 through an exit port 304 as shown in FIG. 9D they proceed into the electrically active/passive reformation catalytic unit 60 shown in FIG. 1 through passage 306 as shown in FIG. 9A. This unit consists of an outer shell 308 within which resides perforated catalytic plates 310 suspended and insulated within insulator blocks 314. Electrical positive and negative terminal rods 316 help to hold plates 310 in spaced relation.

Power is supplied to catalytic unit 60 by the power pack 320 shown in FIG. 9C. Power pack 320 is controlled by a frequency controller 322, a band width controller 324, and a power controller 326. These three controllers 322, 324, and 326, enable full control of the electrical potential applied to catalytic plates during operation.

Upon entering said catalytic reformation unit 60 through passage 306 the volatized materials, still in a gaseous state, pass through said catalytic plates 310, FIG. 9B by way of the perforations provided therein as shown in 310 FIG. 9B. Said catalytic plates can be activated by said electrical sources to remain in a passive condition. After exposure to said conditions all volatized materials exit said catalytic reformation unit through exit passageway 301 as shown in FIG. 9A.

After being produced, volatized materials pass from reformation catalytic unit 60 to a condensation/thermal recovery section 70 of system 10 as shown in detail in FIGS. 10A–10E. Recovery section 70 is composed of several sub-units of a type of fin-tube type heat exchanger 330 as shown in 11A and 11B or a spiral-type heat exchanger unit 332 such as shown in FIGS. 10C–10E. Both configurations are of an accepted standard design but having several exceptions in both use and manner of manufacture.

FIG. 10A shows a cross-sectional view of fin-tube heat exchanger unit 330. In this view it is shown the outer passages 334 and a separate inner passage 336

Shown in FIG. 10B is a volatized material inlet port, 340; condensed materials outlet port 342; liquid/slurry feedstock inlet port 346; and liquid/slurry feedstock outlet port 348.

In operation recovery section 70 in the form of a fin type heat exchanger 330 would be mounted within an enclosure of any appropriate design and heavily insulated so as to prevent thermal losses during operation. The in-coming (cold) feedstock will enter at the feedstock inlet port 346 (FIG. 10B) and be injected into inner passage 336 (FIG. 10A). It would travel through heat exchanger 330 and exit at feedstock outlet port 348. Concurrently, the out-feed volatized materials would enter heat exchanger 330 at the volatized materials inlet port 340 and travel through heat exchanger 330 through outer passages 334 (FIG. 10A) and exit heat exchanger 330 at the condensed materials exit port 342 (FIG. 10B).

By this means is established a thermal counter-flow wherein the two materials flow through heat exchanger 330. This manner of operation has shown itself capable of using the in-coming feedstock to cool and condense the volatized materials as it is thereby pre-heated before entering the processing system. This recovers the thermal energy which would otherwise be and usually is, wasted in such operations.

An alternate means of achieving the same results, but in a smaller space, is the employment of what is known as a spiral-wound heat exchanger as shown in FIGS. 10C–10E in top, side, and partially cut-away, perspective views, respectively. Though manifested in an entirely different form, this unit operates upon the same thermodynamic principals as previously described.

This feature alone is of tremendous importance to the economy and operation of this system. The economical aspect is based upon the fact that such processes are invariably driven and maintained by available thermal energy. Likewise the production rate is dictated by the availability of thermal energy, ie, . . . the more thermal energy available the higher the hourly processing/production rates. There is likewise the inescapable fact the production of thermal energy costs money in one form or another. In the case of this invention wherein the process produces materials which can then be used to fuel the thermal energy production requirements it must be considered that every unit of product consumed as fuel is one less unit of product available for revenue-producing sales.

In both examples given above, it has been shown that the use of such an arrangement will allow this system to operate at a production level and rate of a tremendously larger unit of like construction which is operated by regularly accepted means as described previously.

The manner of employment has been previously described above. The benefits are shown to be an almost geometric production increase in processing and production rates. This phenomenon is best described by an example:

Hypothesize that a unit is built with a 3,000,000 (three million) British Thermal Unit Per Hour capacity furnace burner. The feedstock material is a liquid-form material. The thermal recovery rate is a modest (by reliable test standards) 85% of available thermal energy, ie . . . 3,000,000 BTU's are produced per hour and 85% of that, or 2,550,000 BTU's are recovered and returned to the processing environment.

During the second hour another 3,000,000 BTU's are produced within the system. But there is a recovered additional 2,550,000 BTU's available so the effective BTU availability for the second hour is a total of 5,550,000 BTU's. This level of thermal availability was achieved at no additional hourly fuel expense. This will progress into additional hours in the manner of 7,717,500 BTU's, 9,559,875 BTU's, 11,125,893 BTU's, etc. . . . This progression will continue until a "steady state" condition will exist at which point the 15% of unrecovered thermal energy will exactly equal the amount produced (3,000,000 BTU's per hour). At this point the system will have achieved a processing/production rate several times that of the same system without said thermal recovery system.

Tests to verify this degree of thermal recovery/transfer. In one specific case, a 3,000,000 BTU/hr. Eclipse Scotch-Type Dual-Fuel Steam boiler was used in conjunction with 144 linear feet of Fin-Tube type heat exchanger elements. The in-coming feedstock was recovered waste crude oil delivered to the unit at an entrance temperature of 52 degrees F. The exit material was represented with steam at a pressure of 25 pounds per square inch and 250 degrees F. The heat exchanger elements were enclosed in a metal box and packed with mineral or "rock" wool to a thickness of 4 inches.

After stability was established the results were that the steam was condensed back into water with a temperature of 62 degrees F. and the oil exited the unit at 198 degrees F.

The exhaust from the furnaces can be subjected to further thermal recovery if necessary. However, in light of previously mentioned tests that is probably not necessary. As a point in fact, the exhaust gases are usually so devoid of residual thermal energy that they will not rise within the exhaust stack. Therefore, the exhaust stack 54, has to be positioned horizontally, just above the processing chambers 40, 50 or have an exhaust extraction fan 350, FIG. 3 installed in order for the furnaces to operate.

During a test of a prototype unit of the present invention, the ambient atmospheric temperature was 91 degrees F. The small test unit was fired off and run to steady-state. At that point the furnace temperature was 2,200 degrees F., the in-coming test fluid (water) was at 53 degrees F., and the exhaust temperature was only 82 degrees F. This was achieved in a vertical distance (furnace to exhaust collector plenum) of 22 inches. Imperative due to this condition is the use of forced-air furnace burners as shown as 351 in FIG. 3 of the drawings.

Because the temperature of the in-coming feedstock is approximately the same as the exit temperature of the volatized material, it has become expedient to manufacture thermal recovery/condensation unit 70 in such a manner that the inner passage 336 is made of a catalytic-type metal or material. This enables the initiation of the conversion of part of the feedstock material within this unit instead of in retorting/processing chambers 40, 50, themselves.

In processing hydrocarbon contaminated soils the test units have shown themselves able to completely decontaminate the soils as well as convert the contaminants to a recoverable valuable form.

Many of the capabilities of the test units can better be illustrated by the examination of the results of tests:

Test #1:
Sample:
Test sample of reclaimed waste crude oil. The tests were performed on three samples: Untreated Sample which was the original feedstock, Intermediate Phase which was an attempt to produce synthetic light crude oil, and Final Product which was an attempt to produce mostly gasolines and diesels. C5 through C12 is mostly gasoline components, C12 through C15 is diesel, C15 through C20 is light-to-medium fuel oils and C20 through C35+ is heavy fuel oils, bunker fuels and residuals:

| Sample | C5–C12 | C12–C15 | C15–C20 | C20–C35+ |
|---|---|---|---|---|
| Untreated | 21.00% | 16.75% | 9.75% | 52.50% |
| Intermediate | 17.20% | 36.25% | 18.00% | 28.55% |
| Final Product | 69.25% | 18.00% | 11.50% | 1.25% |

Total recovery on both conversions was over 93% (liquid phase) of the original sample as measured by weight; 1.15% of the original sample was recovered as solids and approximately 5.85% was converted to gases and burned as fuel. The samples had remained stable in their converted and recovered forms for several years.

Test #2:
Sample: was a representative sample of soils and waste waters contaminated with organic solvents.
Test Results After Processing:
Produces Product;
    Water 69.50%
    Oils 30.00%
    Solid 00.50%
Heat of Combustion of Oils 21,124 B.T.U./pound
Before/After Results of Objectionable Materials:

| Material | Before Processing | After Processing |
|---|---|---|
| Benzene | 0.924 MG/KG | Below Detectable Limits |
| Ethel Benzene | 1.011 MG/KG | Below Detectable Limits |
| Toluene | 1.037 MG/KG | Below Detectable Limits |
| Xylene | 0.927 MG/KG | Below Detectable Limits |

-continued

| Material | Before Processing | After Processing |
| --- | --- | --- |
| Anthrocene | 68.61 Mg/Kg | Below Detectable Limits |
| Benzo(a)Anthrozene | Below Detectable Limits | Below Detectable Limits |
| Benzo(2)Pyrene | Below Detectable Limits | Below Detectable Limits |
| Sis(2-ethylhexyl) Phynolate | 28.87 MG/KG | Below Detectable Limits |
| Chrysene | Below Detectable Limits | Below Detectable Limits |
| Di-N-Butylphxxx | 43.66 MG/KG | Below Detectable Limits |
| Napthalene | 72.16 Mg/KG | Below Detectable Limits |
| Phenol | Below Detectable Limits | Below Detectable Limits |
| Ethene | Below Detectable Limits | Below Detectable Limits |

Catalysts Used In This Test: Antimony, Beryllium, Cadmium, Chromium, Copper, Iron, Nickel, Platinum, Selenium, Silver, Thallium, and Zinc.

Test #3:

The object of the test was to establish that the procedure works and the recovery percentages plus test the reduction of objectionable chlorides.

Test Results:

Out of a 20 ml sample, 19.95 ml. were recovered after processing for a recovery rate of 99.75% of the original feedstock Chlorides were decreased from 7,000 parts per million to below detectable limits.

An additional advantage of the present invention is that various components can be built and operated independently in various configurations and sizes so as to better facilitate much-needed and required benefits. One such example of this capability is the employment of a vertical retorting vessel component upon a petroleum drilling rig for a purpose of processing oil based drilling muds and other various oil-based and chemical-based waste materials generated thereon. In said particular case, floor-space upon an operational platform is at a premium, and most especially upon the decks of off-shore drilling platforms. Therefore the minimum footprint of such a system is extremely desirable.

With a system component having the ability to process materials using electric heat producing elements, there would be no requirement for the use of combustion furnaces in proximity of a drilling operation, such practices being extremely hazardous in the instance of a gas blow-out during such an operation.

Additionally the fuel cell co-generation capabilities of such a unit can turn produced gas into electricity without the need for a generation engine or a turbine, thus greatly reducing the danger of a catastrophic fire under such circumstances while producing at least a great percentage, if not all or an excess, of its own electrical power requirements.

The ramifications of the development and employment of the disclosed invention are almost limitless. The present invention, consisting of both the process and the apparatus with which to accomplish and facilitate said process, along with and including all the elements thereof, whether singularly and/or in combination or variation thereof, is unique in that feedstock materials are broken down into their component molecular and atomic components, or parts or radicals thereof, and these components thereafter are utilized to facilitate and accomplish the production of entirely new and unique materials therefrom by the process of re-arranging and combining said components in a stable recoverable form completely unique and different from the original feedstock materials.

Variations of the general process coupled with the various possible embodiments of the apparatus will facilitate processing of both organic and inorganic feedstock materials of vast description and complexity.

As a process for the facilitation of production of fuels the invention will enable the conversion of hydrocarbon products and waste materials into materials which will be easily utilized by existing refining and petrochemical processing facilities without modification to existing designs and/or operational procedures of those facilities. This will allow the use of both agricultural, industrial, commercial and residential waste products as feedstock for fuel production.

In the field of waste disposal the invention will facilitate the conversion of medical, municipal, industrial and agricultural wastes into usable end products as well as materials which will be used for further manufacturing processes.

In the field of primary fuel production said invention will enable the direct conversion of already proven vast available natural gas and coal supplies of both high and low quality, heavy crude oils, sulfur-laden natural crude oils, oil tar sands, and oil shale deposits into readily available and usable fluid state synthetic crude oils which can thereafter be processed exactly like natural crude oils in existing processing facilities.

Utilizing already located and proven reserves of the aforementioned natural resources, as indicated by the United States Department of Energy, through their published studies, the United States would thereafter be completely fuel independent of foreign imported oils and their products for several hundred years. Further, utilizing already developed resource utilization programs, coupled with the inherent operational characteristics of said invention, these vast reserves could be exploited without significant harm to the environment.

Additionally, utilization of this invention, using either a disclosed process and/or application for the purpose of de-sulfurization and/or de-chlorination of existing fuels such as diesels, light fuel oils, heavy fuel oils and/or residual fuel oils, contaminated coals and rubber product fuels derived from used tires, or crude oils having naturally occurring contaminants of like nature would reduce environmental pollution as well as enable producers of such materials to meet or exceed existing and future federally mandated requirements for this purpose.

In the field of feedstock production, the invention and readily apparent variations thereof will enable and facilitate the production of both standard accepted feedstock materials as well as the development of new materials for inclusion in production and processing. Utilizing the present method of acquiring product components from the breaking down of feedstock materials into their molecular and atomic components and thereafter utilizing these components as the building blocks for re-assembly into new stable materials would enable the manufacture of required materials instead of acquiring said components from natural sources. Alternately, said procedure would enable the production of tailor-made production components in order to facilitate the production of products otherwise un-producible by any other presently known means.

This would include, but by no means be limited to, the production of medical products and components, medical pharmaceuticals and components thereof, unique chemicals and chemical compounds, industrial chemicals, agents and reagents, and many other uses which will become apparent upon consideration thereof.

Likewise, several of the embodied components and elements of operation will be shown to have additional applications within their own right:

The utilization of microwave, maser, laser and ultrasound components, and especially of microwave, produce results far in excess of that to be expected only from the thermal energy derived therefrom.

Microwave energy is capable of de-vulcanizing rubber compounds so that the rubber can be melted and re-utilized, so that seemingly stable oil/water emulsions can be broken more easily and precisely, and so that other molecular bonds could be disrupted or broken entirely thereby. By manipulation and control of the frequency of the emittence, the strength of the emittence and the pulse-width of the emittence could and would produce varying but predictable results in these previously mentioned effects.

Said effects include, but are not limited to the selective breaking of molecular bonds at precise locations upon or within the subject molecule, the selective weakening of specific bonds and many more predictable beneficial results. It can only be expected that additional applications for this practice and employment will be revealed with additional practice.

Likewise, subjecting catalytic elements within the system to electromotive forces during processing procedures shows great promise. While the molecular mechanism of this practice is not fully understood, it can only be expected that additional study, research and consideration will reveal many additional utilizations for said practice in this and other applications of both similar and dissimilar nature.

And while the complete resulting effects of said practice is as of yet relatively poorly understood, said practice shows great promise for further exploration and development.

Additionally, the system and the process have shown themselves to almost invariably produce gases that are particularly rich in free hydrogen gas. Hydrogen gas is particularly desirable as a fuel for alternative power generation as a fuel for such automobiles as well as a fuel utilized in the operation of fuel cell electric generation components of all sizes. The following catalytic agents tested thus far include Aluminum, Antimony, Automotive Catalytic Converter Matrix, Beryllium, Cadmium, Chromium, Cobalt, Cobalt Molybdenum Alumina, Copper, Iron, Molybdenum, Nickel, Nickel Molybdenum Alumina, Palladium, Platinum, Selenium, Silver, Thallium, Vanadium, and Zinc. Also used are various carbonates such as Sodium Carbonate and Calcium Carbonate to suppress development of Hydrogen Sulfide Gas and Sodium Sulfide to promote development of high-grade gases from produced char within the system.

The presented system, and of component parts, have shown themselves readily adaptable as to size and configuration in various forms. Various test models have been built and tested ranging in size from under five pounds to over 800 pounds without loss of functionality or capability to perform required functions. Therefore it is believed that the system will be scaled up or down with facility in order to meet various and diverse functional requirements.

Additionally, Inventor knows of no reason why the system cannot be sized so as to be easily transportable over the highway systems, in commercial transport aircraft, and on commercial oceanic shipping. The present invention can be mounted upon water craft of various size so as to be taken to the site of oil or chemical spills and/or accidents to enable on-site operation and function.

In the case of conversion of natural resources such as coal, oil tar sands and/or oil shales said systems are capable of being mounted upon self-powered under-carriages and thereby taken into the mining sites in order to conduct on-site operations. In such an applications, the mobile systems will and/or can be fitted with standard mining fixtures presently in existence which grind and/or otherwise mine said deposits and thereby become independent of other presently required infrastructure of said operations. Likewise various components of said invention can be built and operated independently, such as a vertical or a horizontal unit in order to better serve particular operational requirements.

Those skilled in the art of waste chemistry will understand that many modifications and substitutions can be made to the preferred embodiments herein described without departing from the spirit and scope of the present invention, defined by the appended claims.

What is claimed is:

1. A method for processing waste materials having volatizable constituents, said method comprising the steps of:

feeding waste materials having volatizable constituents into a chamber;

adding abrasive materials to said waste materials;

stirring said waste materials and said abrasive materials;

heating said waste materials in said chamber so that volatizable constituents in said waste materials volatize;

separating said volatized constituents;

exposing only said volatized gases directly to electromagnetic radiation in order to selectively dissociate molecules within said volatized gases to produce selected byproducts; and recovering said byproducts.

2. The method as recited in claim 1, wherein said chamber has an inlet and an outlet, and wherein said heating step further comprises the step of imposing a heat gradient in said chamber, wherein heat is increased from said inlet to said outlet so that each volatizable constituent of said volatizable constituents volatizes at the volatization temperature of said each volatizable constituent.

3. The method as recited in claim 2, wherein said heat gradient is imposed by applying heat to said chamber near said outlet.

4. The method as recited in claim 1, further comprising the step of crushing said waste materials in said chamber.

5. The method as recited in claim 1, further comprising the step of rotating said chamber to agitate said waste materials.

6. A method for processing waste materials having volatizable constituents, said method comprising the steps of:

feeding waste materials having volatizable constituents into a chamber;

adding abrasive materials to said waste materials;

stirring said waste materials and said abrasive materials;

heating said waste materials in said chamber so that volatizable constituents in said waste materials volatize;

separating said volatized constituents;

exposing only said volatized gases directly to wave energy in order to selectively dissociate molecules within said volatized gases to produce selected byproducts; and recovering said byproducts.

7. The method as recited in claim 6, wherein said wave energy is ultrasonic wave energy.

8. The method as recited in claim 6, wherein said chamber has an inlet and an outlet, and wherein said heating step further comprises the step of imposing a heat gradient in said chanter, wherein heat is increased from said inlet to said outlet so that each volatizable constituent of said volatizable constituents volatizes at the volatization temperature of said each volatizable constituent.

9. A method for processing waste materials having volatizable constituents, said method comprising the steps of:

feeding waste materials having volatizable constituents into a chamber;

adding abrasive materials to said waste materials;

stirring said waste materials and said abrasive materials;

heating said waste materials in said chamber so that volatizable constituents in said waste materials volatize;

rotating said chamber to agitate said waste materials;

separating said volatized constituents;

exposing only said volatized gases directly to wave energy in order to selectively dissociate molecules within said volatized gases to produce selected byproducts; and recovering said byproducts.

10. The method as recited in claim 9, wherein said chamber has an inlet and an outlet, and wherein said heating step further comprises the step of imposing a heat gradient in said chamber, wherein heat is increased from said inlet to said outlet so that each volatizable constituent of said volatizable constituents volatizes at the volatization temperature of said each volatizable constituent.

* * * * *